(12) United States Patent
Rico

(10) Patent No.: US 10,841,247 B2
(45) Date of Patent: Nov. 17, 2020

(54) SOCIAL MEDIA CONNECTION FOR A ROBOT

(71) Applicant: Sony Interactive Entertainment Inc., Tokyo (JP)

(72) Inventor: Javier Fernandez Rico, Pacifica, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 290 days.

(21) Appl. No.: 15/887,937

(22) Filed: Feb. 2, 2018

(65) Prior Publication Data

US 2019/0245812 A1    Aug. 8, 2019

(51) Int. Cl.
*G06Q 10/00* (2012.01)
*H04L 12/58* (2006.01)
(Continued)

(52) U.S. Cl.
CPC .............. *H04L 51/02* (2013.01); *A63F 13/35* (2014.09); *A63F 13/67* (2014.09); *A63F 13/73* (2014.09);
(Continued)

(58) Field of Classification Search
CPC .... G10L 2015/227; G06F 9/451; G06F 3/011; G06F 3/016; G06F 3/04815; G06F 3/04817; G06F 3/0482; G06F 3/167; G06F 40/205; G06F 16/9535; G06F 1/163; G06F 3/017; G06F 16/2272; G06F 16/2282; G06F 16/2291; G06F 16/2379; G06F 16/2453; G06F 16/24565; G06F 16/252; G06F 16/27; G06F 16/29; G06F 16/951; G06F 19/3418; G06F 1/1626; G06F 1/1632; G06F 2009/4557; G06F 21/31; G06F 21/6245; G06F 21/6254; G06F 2203/0383; G06F 30/13; G06F 3/015; G06F 3/048;
(Continued)

(56) References Cited

U.S. PATENT DOCUMENTS 8,321,364 B1 * 11/2012 Gharpure ............... G06Q 30/02
706/45
8,996,429 B1 * 3/2015 Francis, Jr. ............ G06N 3/008
706/12

(Continued)

OTHER PUBLICATIONS

Editorial: When AI goes bad as humans. University Wire [Carlsbad] Mar. 28, 2016.*
(Continued)

*Primary Examiner* — Gabrielle A McCormick
(74) *Attorney, Agent, or Firm* — Penilla IP, APC

(57) ABSTRACT

Methods and systems for using a robot to interact in a social media includes receiving a request for registering the robot in the social media from a user. In response to the request, user profile of the user is retrieved. The user profile of the user identifies privileges assigned to the user for interacting in the social media. The robot is paired to the user account of the user by generating a second user account for the robot in the social media and assigning, to the robot, a subset of the privileges associated with the user account. The privileges allow the robot to access the social interactions available in the user account and to generate social interactions on behalf of the user, which are then posted to the social media for the user.

22 Claims, 12 Drawing Sheets

(51) Int. Cl.
| | |
|---|---|
| *A63F 13/98* | (2014.01) |
| *A63F 13/35* | (2014.01) |
| *A63F 13/73* | (2014.01) |
| *A63F 13/87* | (2014.01) |
| *A63F 13/75* | (2014.01) |
| *A63F 13/67* | (2014.01) |
| *H04W 4/21* | (2018.01) |
| *G06F 16/335* | (2019.01) |
| *B25J 9/00* | (2006.01) |
| *G06Q 50/00* | (2012.01) |
| *H04L 29/06* | (2006.01) |

(52) U.S. Cl.
CPC ............ *A63F 13/75* (2014.09); *A63F 13/87* (2014.09); *A63F 13/98* (2014.09); *B25J 9/0003* (2013.01); *G06F 16/337* (2019.01); *G06Q 50/01* (2013.01); *H04L 63/101* (2013.01); *H04W 4/21* (2018.02)

(58) Field of Classification Search
CPC ............ G06F 3/0481; G06F 3/04812; G06F 3/04847; G06F 3/0488; G06F 3/1454; G06F 40/35; G06F 8/38; G06F 9/44; G06F 9/4488; G06F 9/453; G06F 9/455; G06F 9/45508; G06F 9/45512; G06F 9/45533; G06F 9/45558; G06F 3/0484; G06F 3/04842; G06F 3/04845; G06F 11/0706; G06F 11/0766; G06F 11/32; G06F 11/3409; G06F 11/3438; G06F 11/3466; G06F 11/3476; G06F 11/36; G06F 11/3612; G06F 11/3688; G06F 16/217; G06F 16/2228

See application file for complete search history.

(56) References Cited

U.S. PATENT DOCUMENTS

| | | | |
|---|---|---|---|
| 9,724,824 B1 * | 8/2017 | Annan | ............ B25J 9/16 |
| 9,921,574 B1 * | 3/2018 | Annan | ............ G05B 19/4155 |
| 2008/0133716 A1 * | 6/2008 | Rao | ............ H04L 67/02 709/220 |
| 2008/0160877 A1 | 7/2008 | Lipman | |
| 2010/0274902 A1 | 10/2010 | Penman et al. | |
| 2014/0349258 A1 | 11/2014 | Lore | |
| 2015/0360139 A1 | 12/2015 | Watry | |
| 2018/0090145 A1 * | 3/2018 | Kume | ............ G10L 13/033 |
| 2018/0121784 A1 * | 5/2018 | Ichiboshi | ............ G16H 50/20 |
| 2019/0366557 A1 * | 12/2019 | Gewickey | ............ B25J 11/0005 |

OTHER PUBLICATIONS

Poquet, Rosa _ International Searching Authority _ PCT/US2019/014359 _ PCT Notification of Transmittal of the International Search Report and the Written Opinion of the International Searching Authority, or the Declaration _ dated Apr. 15, 2019 _ 13 Pages.

* cited by examiner

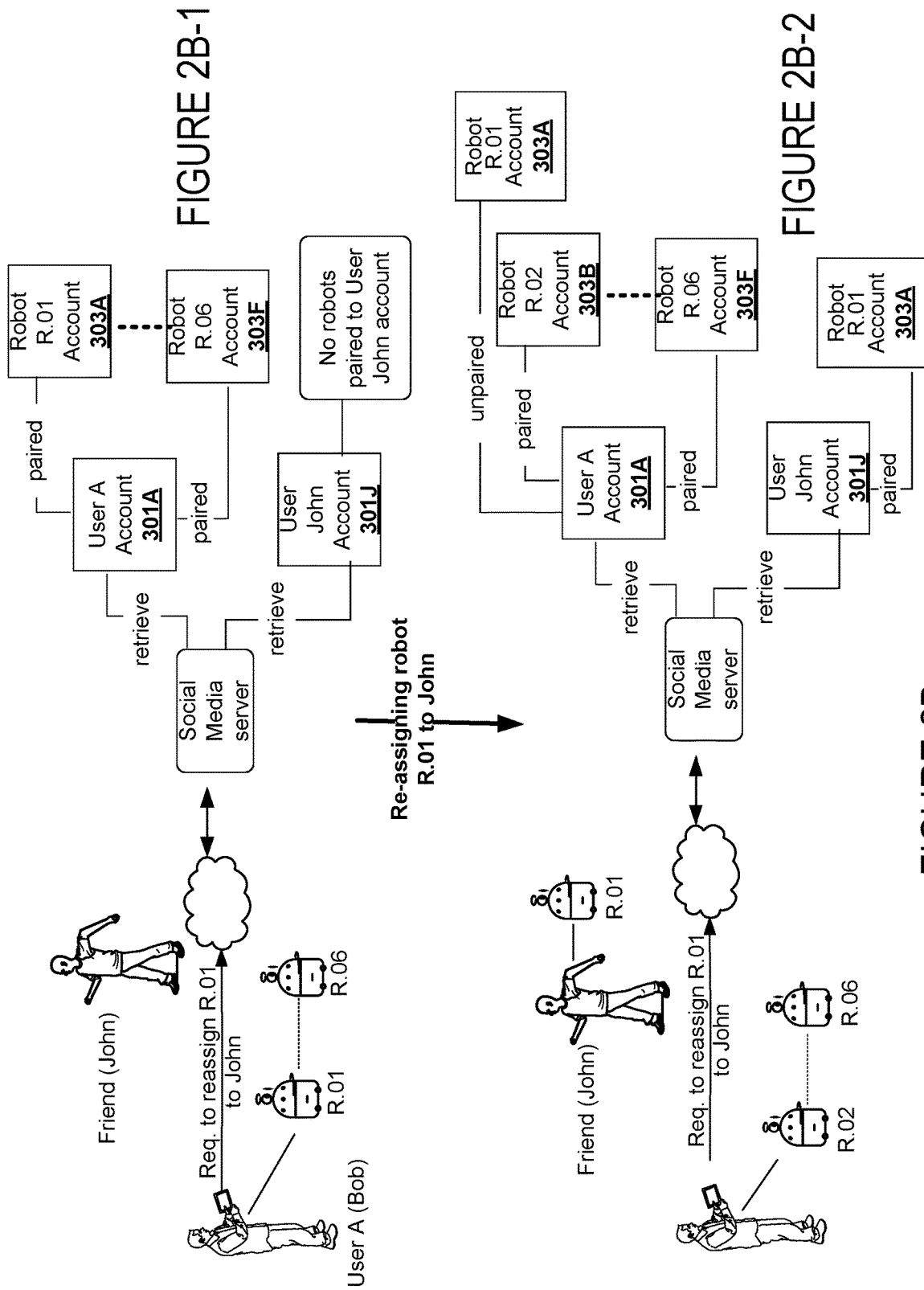

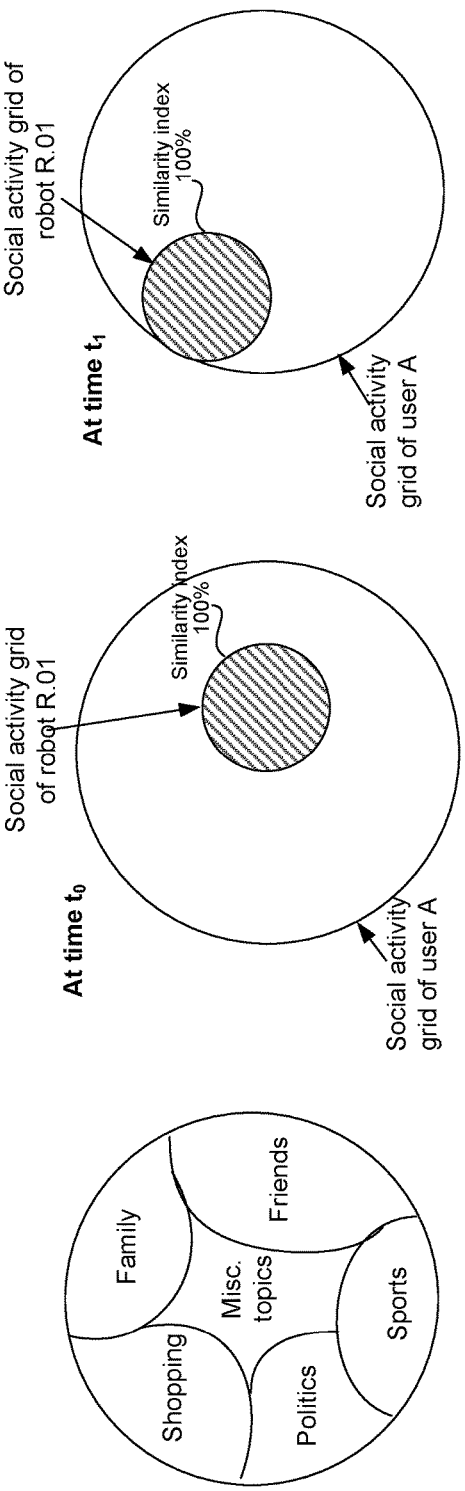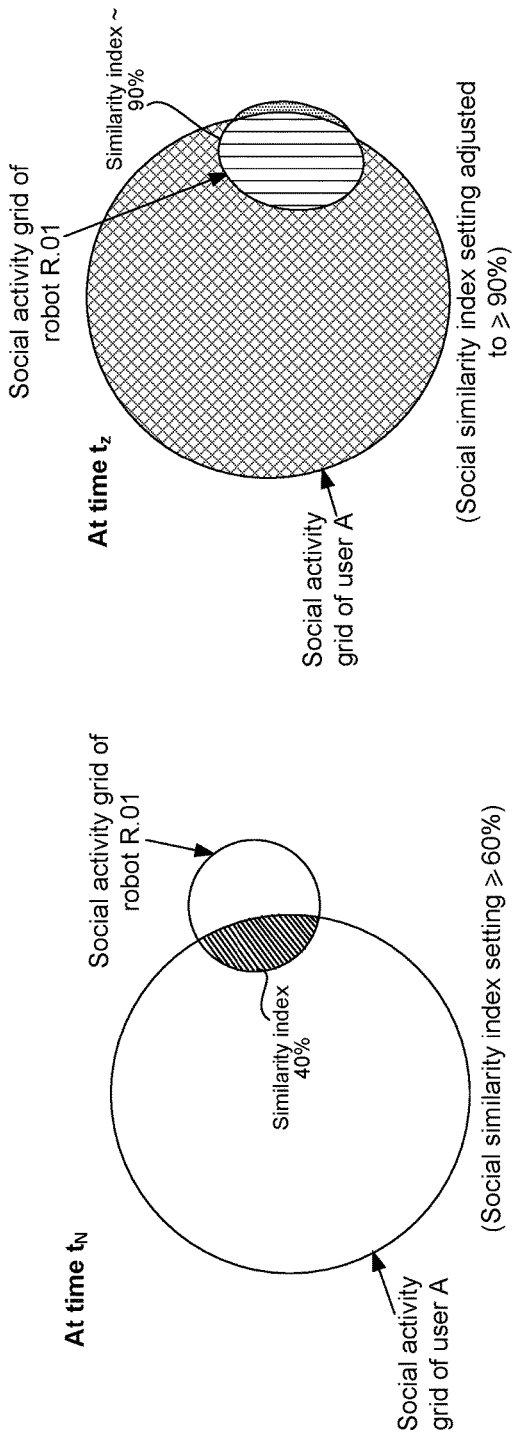

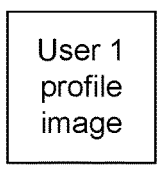 Bob Smith
Posted: Nov 1, 2017, 17:58, San Francisco, California
User 1 comment: ------------------------------------------------------------
------------------------------------------------------------
------------------------------------------------------------
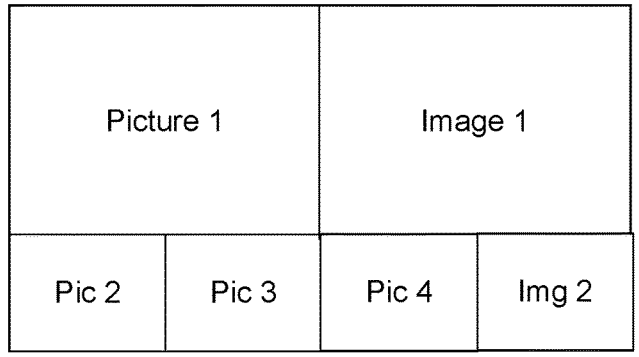
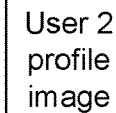 Jane Hope comment: ------------------------------------------
Posted: Nov 1, 2017, 18:01, San Jose, California
 Sara Edward comment: ----------------------------------------
Posted: Nov 1, 2017, 18:03, Sunnyvale, California
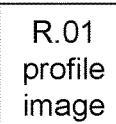 Robot 1 comment: Here are some additional pics and video for the event.....
Posted: Nov 1, 2017, 18:03, Sunnyvale, California
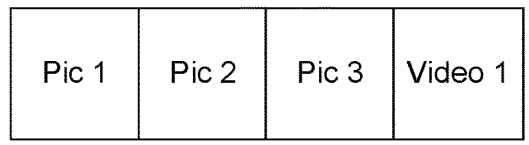
6 👍 / 0 👎              6 Comments
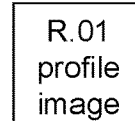 Robot 1 comment: -------------------------------------------
Posted: Nov 1, 2017, 18:25, Sunnyvale, California
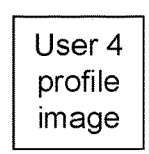 John Childs comment: -----------------------------------------
Posted: Nov 2, 2017, 9:03, Los Angeles, California
Figure 5A

| R.01 profile image | R.01 on behalf of Bob Smith<br>Posted: Nov 5, 2017, 19:35, San Francisco, California |

R.01 comment:  ----------------------------------------------------------------
                ----------------------------------------------------------------
                ----------------------------------------------------------------

| Picture 1 | Image 1 |
| Pic 2 | Pic 3 | Pic 4 | Img 2 |

| User 2 profile image | Alice Copeland comment:  -----------------------------------<br>Posted: Nov 5, 2017, 20:21, San Francisco, California |

| User 3 profile image | Sheila Stone comment:  -------------------------------------<br>Posted: Nov 5, 2017, 21:03, San Jose, California |

| R.05 profile image | Robot 5 comment: Sharing pics and video captured by Jake Tracy for the event.....<br>Posted: Nov 6, 2017, 8:03, San Francisco, California |

| Pic 1 | Video 1 | Video 2 | Pic 2 | -------------- |

36 👍 / 0 👎                                                35 Comments

| R.01 profile image | Robot 1 comment: Thanks for sharing.<br>Posted: Nov 6, 2017, 8:25, San Francisco, California |

| R.04 profile image | Robot 4 comment: ----------------------------------<br>Posted: Nov 6, 2017, 9:03, Boston, Massachusetts |

Figure 5B

SOCIAL MEDIA CONNECTION FOR A ROBOT

FIELD

The present disclosure describes methods and system for associating a robot to a social media account of a user so as to allow the robot to manage social interactions of the user and to allow the robot to socially interact with the social contacts of the user within a social media.

BACKGROUND

Description of the Related Art

The advancement in computer technology has led to many important advancements including cloud based processing, video gaming technology, etc. Video gaming has become increasingly more popular with the advancement of video gaming technology. Together with the advancement in cloud based processing, such as high powered graphics processors, neural networks, increased processor speeds, reliable communication connections with increased and reliable transmission speeds, users are presented with an interactive experience that is desirable and optimal. Cloud-based systems provide unlimited processing power and system resources for execution of interactive applications, such as video games. The cloud-based systems make an overwhelming breadth of legacy and new video games available for users to access and play the video games without having to upgrade their own devices. These cloud-based systems enable streaming of content to remote clients, wherein most processing is done on servers, which may be distributed. Cloud-based gaming, therefore, has been increasing in popularity because users find it easier to access more video game titles without complex hardware restrictions, and game suppliers find it easier to manage game code from centralized locations.

At a more personal level, devices are being developed to assist the users in selecting and interacting with content that is available on a remote server of a cloud-based system or on a local device, such as game console. For example, head mounted displays have been developed and are increasing in popularity as it allows the user to have an immersive interactive experience, such as immersive gaming experience, by allowing the user to interact with content presented on a display of the head mounted display. Similarly, various controllers have been developed to assist the user in providing inputs to the interactive content. The cloud-based system makes it easier to introduce newer devices as majority of the processing is done at the server level and newer devices can be easily integrated at the cloud level rather than at an individual system level.

In addition to controllers, robotic assistants are becoming more popular to assist the users in viewing and interacting with content. Early robotic assistants had limited capabilities and few options to facilitate user interactions.

It is in this context that embodiments of the disclosure arise.

SUMMARY OF THE INVENTION

Embodiments of the present invention disclose methods and systems for providing interactions in a social media using the help of a robot. Broadly speaking, a robot is associated with a social media account of a user. The association is done by pairing the robot to the user account using information provided in a user profile of the user. This association causes generation of a separate social media account for the robot. The social media account generated for the robot includes a subset of the privileges assigned to the social media account of the user thereby allowing the robot access to at least some of the social interactions between the user and the social contacts of the user within the social media and to socially interact on behalf of the user. The social media account for the robot allows the robot to acquire a social media personality that is similar to the user, as the robot acquires some of the privileges of the user. This acquired social media personality of the robot allows the robot to establish social connection with other users, robots of other users on its own and not just with the social contacts of the user with whom the robot is associated. In some implementations, the new social contacts with whom the social connection is established by the robot share at least some personality trend with the user with whom the robot is associated.

Each social interaction made by the robot in the social media may be used to refine the social media personality of the robot. The divergence in the personality of the robot (and hence the profile of the robot) brought about by analyzing the social media interactions, may be controlled by a user, for example, by defining a social similarity index setting. A machine learning algorithm (e.g., artificial intelligence (AI) logic) within the robot is engaged to learn from each social media interaction that the robot has with other users (including robots of other users), and use the learning to refine the profile of the robot of the user. Even with continued evolution, the personality of the robot will continue to express at least some of the personality traits of the user as the profile of the robot initially originated from the social media profile of the user. The evolved personality of the robot is used to influence the social media interactions of the robot. For example, the robot may use its evolved personality when interacting with the user, with other users or robots associated with the other users. Further, the evolved personality of the robot may be used by the robot when socially interacting with social contacts of the user on behalf of the user. Additionally, the evolved personality of the robot may be used to refine content recommended for the robot.

Access to social contacts, social media streams, and to the social media account of the user are provided through formal association of the robot to the user account of the user using the privileges defined in the user profile of the user. In addition, access may also be provided through explicit actions or interactions provided by the user that involves the robot (for example, introduction of the robot to a social contact of the user, or adding the robot as one of the social contacts, etc.). The privileges initially accorded to the robot and refined over time based on continued interaction of the robot within the social media may also be used to dynamically adjust social contacts of the robot within the social media, wherein the social contacts may include other users and robots associated with the other users. The identified social contacts are updated to an access control list maintained for the robot, which is referenced during social interactions of the robot.

Access to the social media account of the user enables the robot to get to know the user's social preferences, frequency and type of actions and interactions of the user in the social media, and to identify topics of conversation that generate emotional connections to the user. Such information may be used in the refinement of the profile of the robot and, thereby the social media personality of the robot. Further, the AI logic of the robot uses the information during generation of social interactive content on behalf of the user.

In one implementation, a method for interacting in a social media using a robot is disclosed. The method includes receiving a request to register the robot in the social media. The request is received from a user account of a user. In response to the request, user profile of the user is retrieved. The user profile of the user identifies privileges assigned to the user in the social media to enable social interactions with one or more social contacts established in the social media. The robot is paired to the user account of the user by generating a second user account for the robot in the social media. The pairing includes assigning to the robot a subset of the privileges associated with the user account. The assigning of the privileges allows the robot to access the social interactions of the user account and to generate social interactions with social contacts established for the user account. Social interactions generated by the robot are posted to the social media.

In another implementation, a method for interacting in a social media using a robot, is disclosed. The method includes receiving a social interaction generated by the robot in the social media. The robot is paired to a user account of a user in the social media by assigning some of the privileges defined for a user account of the user in the social media. The social interaction generated by the robot is evaluating using privileges assigned to the robot. The evaluation is used to compute a similarity index for the generated social interaction that identifies level of similarity of the social interaction in comparison to the social interaction of the user associated with the robot. The social interaction is posted to social streams of one or more social contacts identified from an access control list defined for the robot, when the computed similarity index for the social interaction generated by the robot is within a similarity index setting defined for the robot.

Other aspects and advantages of the invention will become apparent for one skilled in the art from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

FIG. 2B illustrates a simplified process flow of information of re-assigning a robot registered to a user account of a user as illustrated in FIG. 2B-1, to a user account of a friend of the user as illustrated in FIG. 2B-2, in an alternate implementation.

FIG. 4A illustrates a simplified representation of a social activity grid of a user identifying the various social interactions generated by the user or the user was interested in, in accordance to an implementation of the present invention.

FIGS. 4B-1 through 4B-4 illustrate simplified representations of social activity grids of a user and of a robot associated with the user account of the user, based on social interactions captured from the user accounts of the user and of the robot at various times, in accordance to some implementations of the present invention.

FIG. 5A illustrates an example social media feed of a user that includes social interactions provided by a robot associated with the user, in accordance with several implementations of the present invention.

FIG. 5B illustrates an example social media feed of a robot that includes social interactions provided by the robot and of the user associated with the robot, in accordance with an implementation of the present invention.

DETAILED DESCRIPTION

Figure 1A:
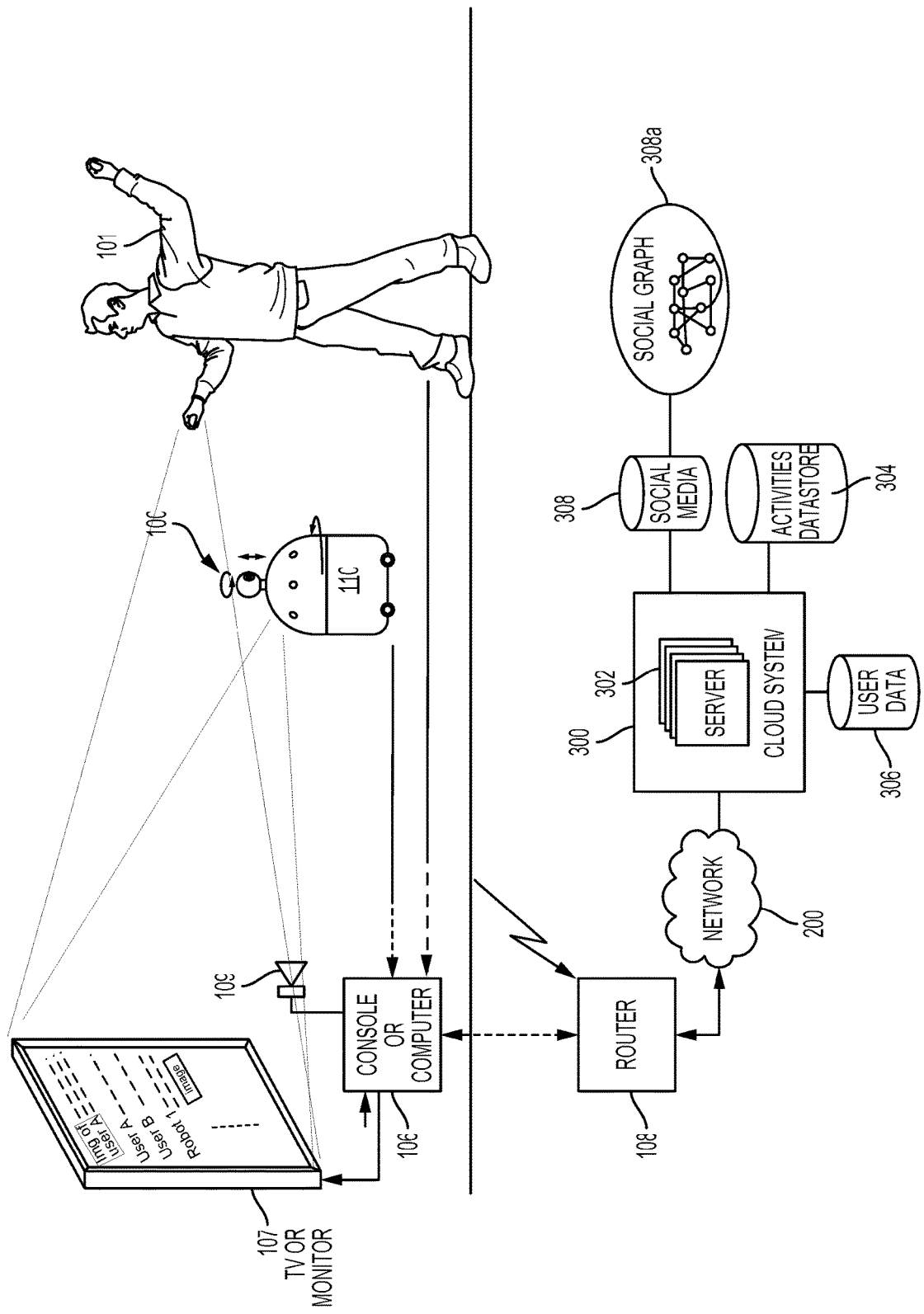
FIG. 1A illustrates a simplified block diagram of an example social media system in which a user and a robot associated with the user are configured to interact and generate social interactions, in accordance with an implementation of the present invention.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to obscure the present invention.

According to various implementations of the present invention a robot is associated with a user by assigning to the robot at least some of the privileges from a user profile defined for the user. This association of the user profile allows the robot to adopt a personality of the user. A new social media account is created for the robot using the assigned privileges. As the user profile of the user is used in creating the new social media account for the robot, the newly created social media account allows the robot to access at least a portion of the social activity grid of the user that includes social media contacts as well as social interactions provided in the social media streams of the user. The robot can interact with any posting available within the social media streams of the user that the robot is given access to and such interactions are posted to the social media streams of the social contacts and to the user's social media stream.

As the robot continues its interactions with the user both on and off the social media, a machine learning logic in the robot learns from each interaction and uses this learning to refine the personality of the robot. This refinement may cause the robot to have its own personality that may be similar in some levels but different in other levels from the personality of the user to whom the robot is associated. In some implementations, the refinement of the personality of the robot may be performed selectively so that certain ones of privileges accorded to the robot from the user account are not subject to refinement while other ones of the privileges are subject to refinement. This selective refinement may be to maintain some semblance of similarity of the personality of the robot to the user to whom the robot is associated. The refined personality of the robot is used during social interactions of the robot in the social media. For example, content presented in the social media by the robot and the social contacts associated with the robot may be refined based on the evolving personality of the robot. Similarly, the evolving personality of the robot may be used by the robot to extend social connection with other robots that are associated with the social contacts of the user and with other users that may share similar personality as the robot.

In addition to the robot having access to the social contacts of the user due to sharing of user profile, the newly created social media account associated with the robot may receive a request from a new user to establish a new social connection between the robot and the new user. In response to the request, the robot may establish the social connection with the new user in accordance to the privileges assigned to the robot. The new social connection provides access to social interactions (i.e., social media postings) of the new user and to social contacts of the new user, based on the social media privacy settings of the new user. The robot thus can simulate the actions of the user to whom it is associated, in the social media as well as act on its own using the machine learning logic.

In some implementations, the request for establishing a new social connection may be received by the robot of user A, for example, from a new robot associated with the new user and may include a link to the social media website. The request may be initiated by the new robot acting on behalf of the new user, and may originate from a user account of the new user or from a user account of the new robot of the new user, wherein the user account of the new robot is created in the social media using a subset of the privileges assigned to the new user. When the robot of user A accepts the request, the social media server may initiate the social connection between the robot of user A and the new robot of the new user and establish the new robot as a social contact of the robot by updating the appropriate access control lists of the robot and the new robot. The social connection allows the robot to access social interactions and social contacts of the new user that are accessible from the user account of the new robot and vice versa. Social interactions provided by the robot and the new robot are updated to appropriate social streams.

In addition to providing social interactions, the robot may be able to provide recommendation to the user on what to post on the social media. As the robot is closely associated with the user, the AI of the robot is learning the personality and preferences of the user from the user's social interactions and is able to generate an emotional connection with the user. Based on this learning, the robot can provide suggestions and recommendations to the user for responding to various posts by the social contacts. In addition to providing recommendations, the robot may be used to manage the scheduling of the user (e.g., setting up a business or social or personal meeting), etc. The various types of interactions generated by the robot allows the robot to develop its own personality that is learned over time from its interactions to the commands or requests or observations of an administrator or owner of the robot (i.e., the user the robot is associated with). This learned personality is used in refining the profile of the robot, which is then used in generating social interactions in response to social interactions available in its own user account and to respond on behalf of the user. In some implementations, the robot associated with a user may receive social interactions from other robots associated with social contacts of the user and respond by generating its own social interactions. The robot, in some implementations, may access the social interactions provided by other robots from the user account of the robot and may access the social interactions provided by social contacts of the user from the user account of the user. In alternate implementations, the robot may access both the social interactions provided by the social contacts and the other robots associated with the social contacts from the user account of the user or from the user account of the robot. For more details on how the AI logic can be intelligently used by the robot to interact in a social media or to commands or requests of a user, reference can be made to U.S. application Ser. No. 15/705,167, filed on Sep. 14, 2017, and entitled "Robot as a Personal Trainer," which is incorporated herein by reference in its entirety.

The various implementations discussed with reference to social interaction of the robot include social interactions of the robot provided in response to social media postings at the user account of the user and social interactions of the robot provided in response to requests and postings from other robots and social contacts at the user account of the robot. The selective refining of the profile of the robot based on the social interactions of the robot ensures that the profile of the robot has sufficient similarity to the profile of the user associated with the robot so as to be able to gain access to the social interactions at the user account of the user. The various implementations are not restricted to social interactions of the robot with social contacts of the user but can also be extended to provide feedback on any other observed activity of the user. With an overview of the invention, details of the various implementations will now be described with reference to the various drawings.

FIG. 1A illustrates a system in which a robot 100 associated with a user 101 is used to access social media account of the user 101 and provide social interactions to social contacts of the user 101 that are similar in style to what is generated by the user 101, in accordance with an implementation. To assist in accessing the social media account of the user 101 within the social network, the robot 100 is communicatively connected to a computer 106 within a local area network using network interface. The communication connection may follow a wireless communication protocol. The computer 106 is connected to the social media server 302 over network 200, such as the Internet. The computer 106 may be any general or special purpose computer known in the art, including but not limited to, a console, a personal computer, laptop, tablet computer, mobile device, cellular phone, tablet, thin client, set-top box, media streaming device, etc., that is capable of being connected to the network 200 via a router 108 or through other wired or wireless communication connections. The robot 100 may interact with the remote server 302 through the computer 106 and the router 108. In one implementation, the computer 106 may itself be a local network device, such as the router (although a separate router 108 is shown in FIG. 1A), that does not perform any processing, but facilitates passage of network traffic.

Alternately, the robot 100 may itself be a networked device that connects to the network 200 directly via the router 108 in order to interact with a remote server 302 (such as a social media server) on a cloud system 300. The communication connection between the robot 100 and the router 108 may follow a wireless communication protocol although a wired communication protocol may also be contemplated. The remote server 302 may be used to identify the user 101. The communication connection between the router 108 and the network 200, in some implementation, follows a wired protocol although wireless protocol may also be contemplated.

In response to receiving a request for registering a robot associated with a user in the social network, the server 302 of the cloud system 300 (e.g., social network system) may interact with user data datastore 306 to first check the social network to see if the robot is already registered to the user or to another user. The identification information of the robot R.01, such as brand name, model number, serial number, etc., may be used to determine if the robot is registered to a particular user. If the robot is not registered to any user in the social media, the server retrieves user profile of a user initiating the request. The retrieved user profile of the user is used to generate a corresponding user profile for the robot 100. Information provided in the user profile of the user 101 identifies the privileges assigned to the user for social interaction within the social network. Some of the privileges assigned to the user may be used to identify a list of social contacts (i.e., "friends") that the user can interact with, type of topics that can be discussed in the social interactions, temporal restrictions for providing social interactions, type and frequency of social interactions, etc.

Once the user 101 is identified, the server 302 may proceed to register the robot (e.g., R.01) to the user account of the user (e.g., user A). Registering the robot includes pairing the robot to the user account of user A using the identification information of the robot R.01 (e.g., brand name or make, model number, serial number, etc.). The pairing includes generating a user account for the robot R.01 in the social network, assigning privileges to the user account of the robot R.01, and linking the user account of the robot R.01 to the user account of the user A so that when the user profile of user A is looked up, the robot R.01 is shown to be linked to user account of user A. It should be noted that the user A can have multiple robots associated to their user account. The privileges assigned to each robot associated with the user account of user A may include a sub-set of the privileges assigned to the user account of user A. Further, each robot associated with the user account of user A may have same sub-set of privileges as the other robots associated with the user A or may have distinct set of privileges.

Based on the privileges assigned to robot R.01, the robot R.01 of user A is provided access to the social media account of user A and is allowed to respond to at least some of the social interactions available at the user account of user A. The privileges accorded to each robot associated with a user are controlled by the user so as to ensure that the robot has sufficient privileges to socially interact in the social media on behalf of the user but does not have the privileges to "hijack" the social media account of user A. The privileges accorded to each robot also ensure that the social interactions provided by the robot in the social media account of user A are similar to user A's social interactions in relation to topic, frequency, time restrictions, social contacts to respond to, social connections to establish, etc. In some implementations, the access to social contacts may be controlled via access control list defined for the robot. The access control list (ACL) identifies at least a subset of the social contacts of the user. The ACL includes a list of social contacts that the robot is not allowed to interact with (e.g., black list of social contacts) and a list of social contacts that the robot is allowed to interact with (e.g., white list of social contacts. Additionally, the privileges may also control the type (e.g., text, video, audio, pictures, etc.) and quality of social interaction generated by the robot.

In some implementations, the robot R.01 of user A is allowed to access the social interactions of user A by accessing the social media account of user A. In other implementations, the robot R.01 of user A is provided access to the social interactions of user A by providing the social interactions of user A at the user account of the robot.

Social interactions provided by the robot R.01 of user A are forwarded to activities datastore 304 to update the social activity grid of the user A and the social activity grid of the robot R.01 associated with each user A. Prior to updating the social activity grid of user A and the robot R.01, the server analyzes the social interactions provided by the robot R.01 to ensure that the social interactions comply with the privileges assigned to the robot R.01 and are within a social similarity index setting defined for the robot R.01. Controlling the access, type and quality of social interactions of the robot by ensuring compliance with the privileges assigned to the robot's social media account enables maintaining the quality of social interactions provided by the robot associated with the user A at an acceptable level. The social contacts, in one implementation, may include one or more robots associated with the one or more social contacts of the user.

In some implementations, presence of a robot in a new geo location in which a new user is present may prompt assigning the robot to the new user in the new geo location. This assigning of the robot to the new user may be to allow the robot to represent the new user in the social media, for example. In another example, the assigning of the robot to the new user may be to allow the robot of the new user to be used for interacting with an interactive application, such as a gaming application, executing in the new geo location. The robot (e.g., R.01) may have been previously associated with a user (e.g., user A) in a first geo location and the presence of the robot in the new geo location may prompt re-assigning of the robot to the new user. The new geo location may be a living room of a house of an acquaintance (i.e., social contact) that user A is visiting with the robot R.01. In such implementations, the one or more external cameras 109 dispersed in the new geo-location may be used to track the new user and the robot R.01 100 in the new geo location. The tracking is to identify the robot and the new user in the geo location. Images of the new user and the robot R.01 captured by the external camera 109 in the geo location are transmitted to the server 302 to determine identity of the new user and the identity of the robot R.01 in the geo location. Having obtained the identity of the new user, the server 302 may query the user data datastore 306 maintained for the social network to obtain the user profile of the new user and to register the robot R.01 to the new user. Registering the robot R.01 to the new user may include removing the association of the robot R.01 to user account of user A and pairing the robot R.01 to the social media account of the new user by associating the user account of new user to the robot R.01. The pairing of the robot R.01 to the new user would cause the robot to get assigned privileges from the user account of the new user so as to access the user account of the new user. Further, because of the re-assigning, the newly assigned privileges from the social media account of the new user would prevent the robot R.01 from accessing the social media account of user A. In some implementation, the association of the robot 100 to the new user may be temporal based or geo location based, and the association remains for a pre-defined period of time or as long as the robot R.01 and the new user are present in the geo-location before reverting the association back to user A. It should be noted that each robot may be associated with multiple users over a course of time but is associated with one user at any particular given time.

During association of the robot R.01 to the new user, the robot may represent the new user in the social media and provide social interactions in the social media on behalf of the new user either by accessing the social media account of the new user or by interacting with the social interactions of the new user accessible from the social media account of the robot. The social interactions of the robot for the new user are updated to appropriate social streams of social contacts and to the activities datastore 304 for the new user.

Figure 1B:
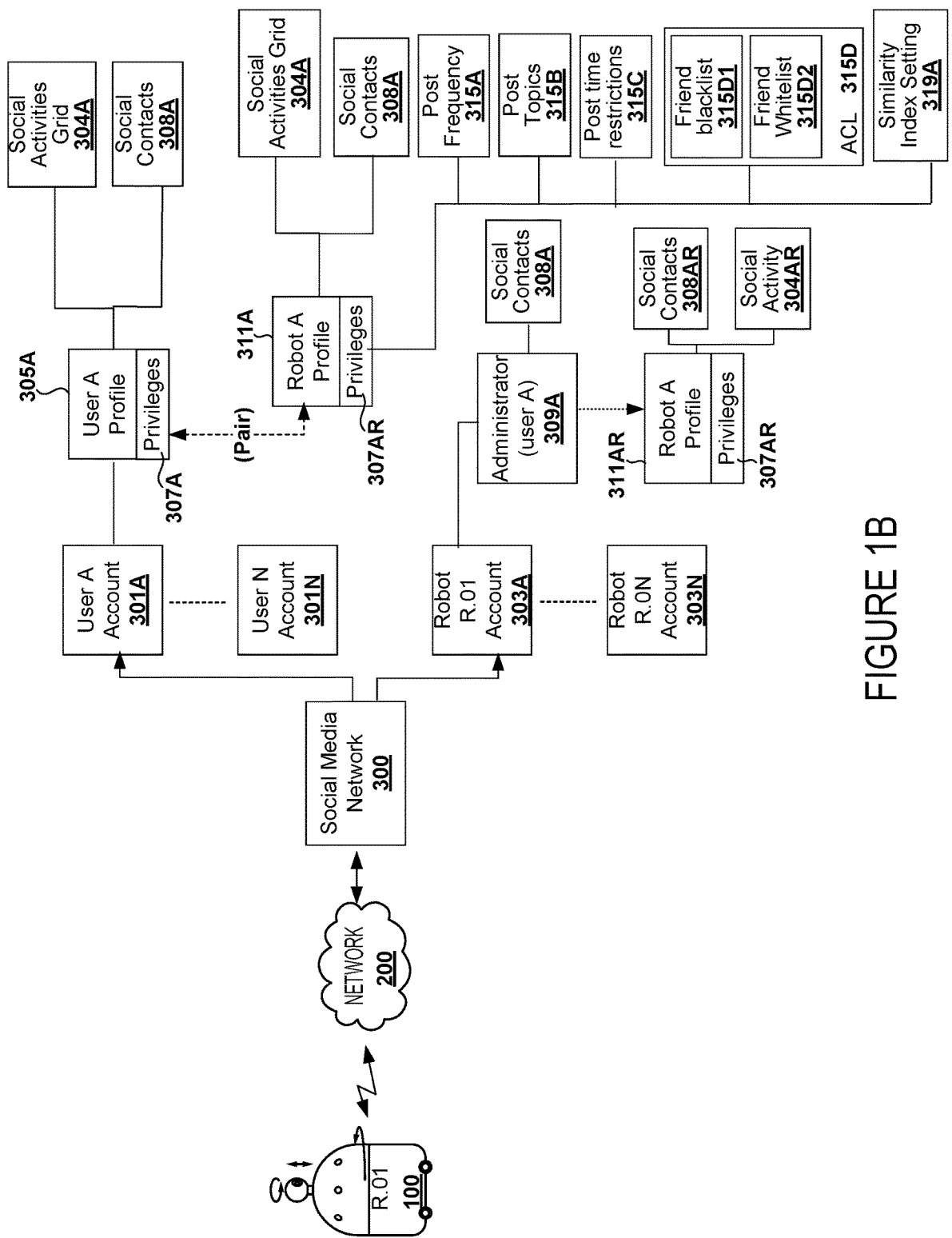
FIG. 1B illustrates an example association of a robot to a user account of a user defined in a social media, in accordance to an implementation of the present invention.

FIG. 1B illustrates an example association of a robot to a user account of a user defined in a social media 300 through a cloud network 200. The social media 300 includes user accounts (301A-301N) of a plurality of users that are registered in the social network. Each user account (e.g., 301A of user A) is associated with a social activity grid that identifies a user profile 305 (e.g., 305A of user A) and privileges 307 (e.g., 307A assigned to user A) for interacting in the social media. The privileges assigned to the user account of the user A are used to determine topics, type of content, frequency of interaction, restrictions placed for social interactions, access control list, social activity, etc., that can be included in the social interaction of user A.

In addition to user accounts of a plurality of users, the social media 300 also includes user accounts of robots (303A through 303N) that are registered to the plurality of users (users A . . . user N) using pairing operations. Each robot is assigned a separate user account when the robot is registered in the social network. Each user account (e.g., 303A) associated with a robot (e.g., R.01) includes a corresponding user account administrator (e.g., 309A), which in many cases is the user that is associated with the robot. For example, the user account administrator 309A for robot A is user A. In addition to the user account administrator 309A, the user account 303A of the robot R.01 identifies a social activity grid (e.g., 304AR) that identifies a user profile (e.g., 311AR) of the robot R.01 specifying the privileges 307AR assigned to the user account 303A of the robot R.01. The user profile 311AR of robot R.01, in turn, is used to identify the social activities 304AR of the robot R.01 and the social contacts 308AR associated with the robot R.01 (R.01 is also identified by reference numeral 100 in FIG. 1A). The user profile 311AR defined for the robot A may be a subset of the user profile 305A of the user A with which the robot R.01 is associated. As a result, the privileges 307AR assigned to the user account 303A of the robot R.01 are a subset of the privileges 307A assigned to the user account 301A of user A. In some implementations, the privileges 307AR assigned to the user account 303A of the robot R.01 may be used to control the posting frequency 315A allowed for the robot, topics 315B that can be included in the postings generated by the robot R.01 or for which the robot R.01 may be allowed to provide social interactions, time restrictions 315C for posting, access control list 315D specifying the social contacts of the user including social contacts that cannot be selected for social interaction (i.e., friend black list 315D1) and social contacts that can be selected for social interactions (i.e., friend white list 315D2). The aforementioned privileges have been provided as mere examples and that fewer or additional privileges from the user account of the user may be assigned to the user account of the robot 303A.

As the robot R.01 provides social activities 304AR on behalf of the user A within the social media, the social activities 304AR of the robot R.01 are evaluated and, in some implementation, the user profile 311AR of the robot R.01 is refined based on the evaluation. In some implementations, an amount of refinement of the user profile 311AR of the robot R.01 may be controlled by user A by defining a similarity index setting 319A for the robot R.01. In other implementations, the similarity index setting 319A may be defined by an administrator within the social media network. The similarity index setting 319A is used to ensure that the user profile 311AR of the robot R.01 does not diverge too much away from the user profile 305A of the user A and that sufficient overlap exists between the user profile 311AR of the robot R.01 and the user profile 305A of the user A. The social interactions generated by the robot A are driven by the user profile 311AR of the robot R.01 and the similarity index setting ensures that the social interactions generated by the robot R.01 do not deviate too far away from that of the user. For example, the similarity index setting for the robot R.01 may be set to 60%. In this example, the user profile of the robot is allowed to be refined up till the setting threshold after which, no further refinement is allowed to the user profile of the robot. The similarity index setting defined for the robot R.01 of user A indicates that the user profile 311AR of the robot R.01 has to have at least a 60% match with the user profile 305A of the user A (i.e., the user profile 311AR of the robot R.01 overlaps the user profile 305A of the user A by about 60%). Alternately, the similarity index setting may be indicative of the amount of divergence that is allowed for the user profile of the robot. In the above example, the similarity index setting defined for the robot would indicate that the amount of divergence between the user profile 305A of the user A and the user profile 311AR of the robot R.01 may not exceed 40%.

Figure 2A:
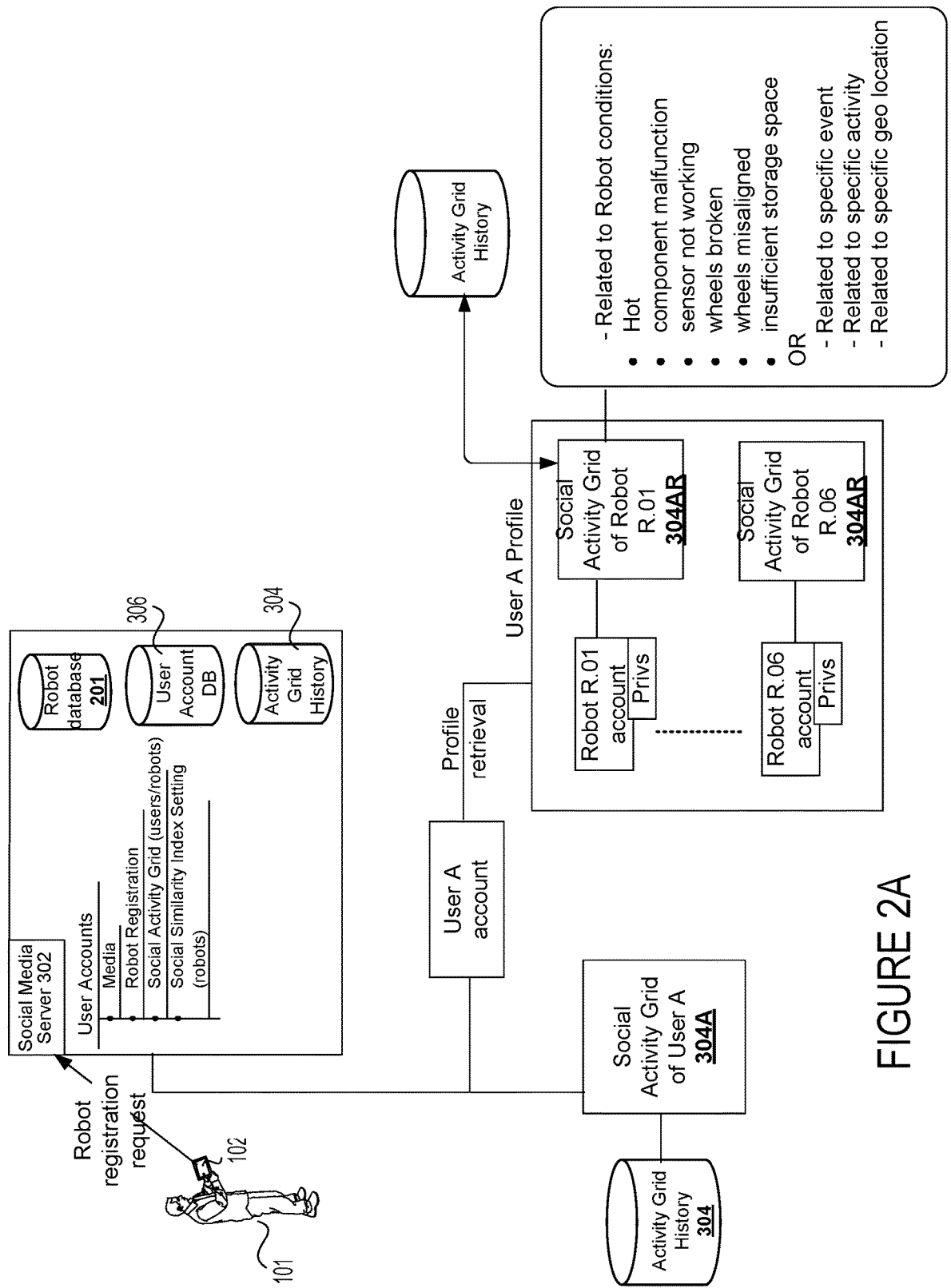
FIG. 2A illustrates a simplified process flow for registering a robot to a user account of a user in response to a registration request initiated by the user and for populating social activity grid of the robot, in accordance to an implementation of the present invention.

FIG. 2A illustrates a simplified process flow of information in response to a request to register a robot to a user account of a user maintained by a social media server 302, and for populating social activity grid of the robot, in accordance to an implementation of the invention.

Figure 3:
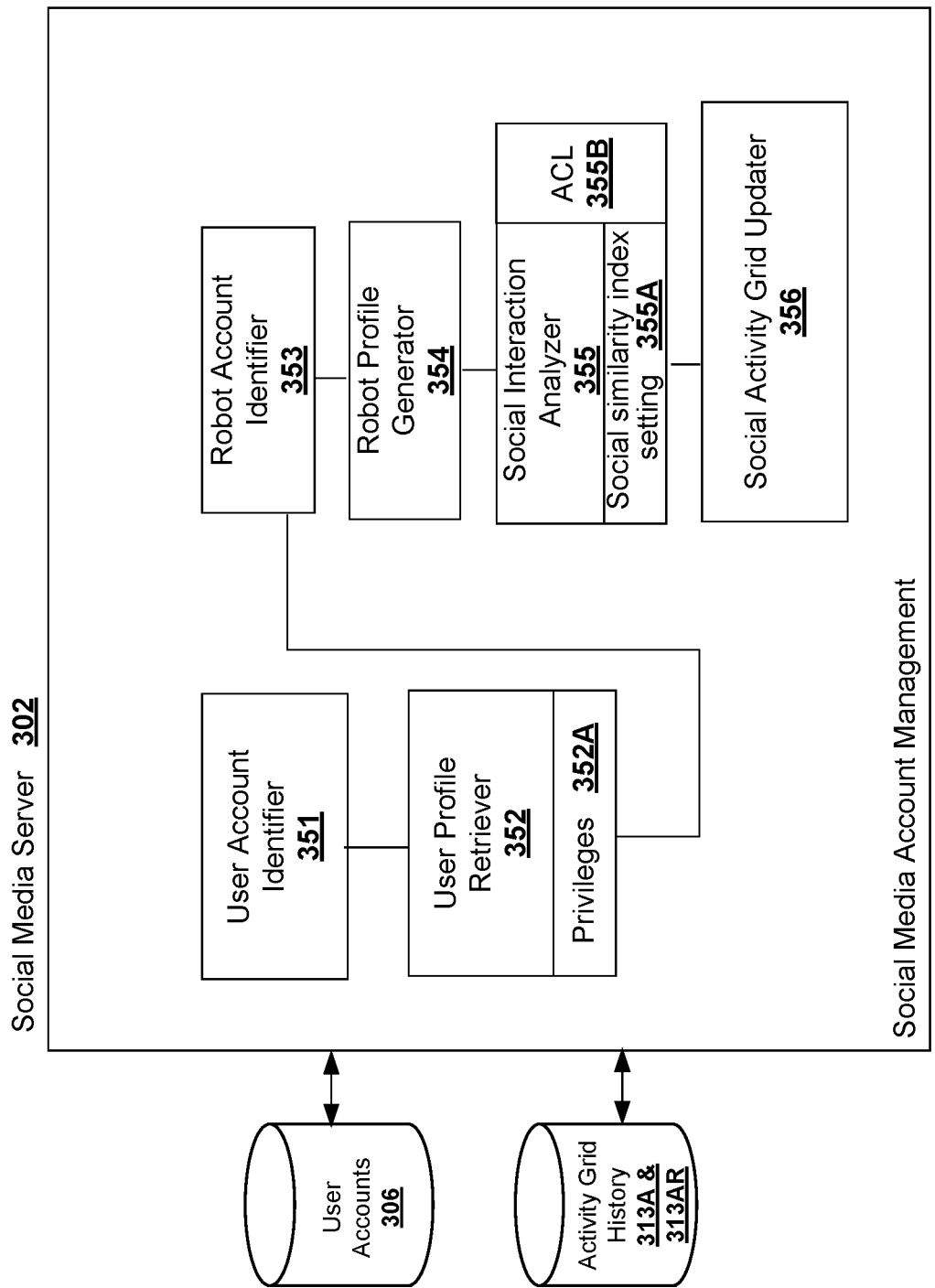
FIG. 3 illustrates various modules within a social media server used for generating a social media account for a robot by pairing the robot to a user account of a user, in accordance to an implementation of the present invention.

FIG. 3 illustrates the various modules within the social media server 302 that is used for registering the robot by generating a user account for the robot, and for populating social activity grid with user interactions generated by the robot. Details of the process of registering the robot in the social media and populating the social activity grids of the robot, the user and the social contacts of the user will now be described by referring simultaneously to FIGS. 2A and 3.

A user 101 may initiate a request to register a robot 100 acquired by the user 101, at the social media server 302 in which the user 101 has a social media account. The request may be initiated using a computing device 102. The computing device 102 may be any general or special purpose computer known in the art, including but not limited to, a console, a personal computer, a laptop, a tablet computer, a mobile device, cellular phone, thin client, set-top box, media streaming device, the robot, etc. The request to register is received at the social media server 302 via the network 200, such as the Internet. The social media server 302 maintains social media accounts of a plurality of users and of a plurality of robots that are registered to the social media accounts of the users, social activity grids of the plurality of users and of the plurality of robots associated with the users. The social media server also maintains various media files and multimedia content exchanged within or uploaded to the social media during the various social interactions, registration details of the robots, social activity grid of the users and robots, and a social similarity index that is defined for each of the robots registered in the social media.

A plurality of databases is available at the social media server 302 and provides information to verify identity of a user, identity of a robot, or to evaluate social interactions generated by the user or the robot. For example, information related to the user, such as user profile, privileges assigned to the user for enabling social interaction, etc., are maintained in a user account database 306, which can be queried when an identity of a user or a robot of a user needs to be determined or verified or when a social interaction initiated by the user needs to be verified. Similarly, information related to a robot, such as user profile of the robot, privileges assigned to the robot, etc., are maintained in the robot database 201, which can be queried any time a robot is to be verified or any time a social interaction initiated by or directed toward the robot needs to be verified. The social media server 302 further includes an activity grid history database 304 that maintains social activity grids of the users (304A) and of the robots (304AR) associated with the users, using the social interactions collected over time. The activity grid history database 304 may maintain information related to each user in separate social activity grids, which includes social activities initiated by or provided at the social media account of each user and each robot, various levels of social contacts of each user and each robot, privacy settings of each user and each robot, privileges assigned to each user and each robot, and other activities initiated by each user or for each user by a robot associated with the respective user. Further, the social activity grid of a robot associated with a user may be maintained separately from the social activity grid of the users or may be integrated into the social activity grid of the user.

In response to the request to register the robot to a user account of the user A in the social media, the user account identifier module 351 of the social media server 302 queries the user account database to retrieve user account information of user A. The user account information is forwarded to the user profile retriever module 352 to retrieve the user profile of user A contained within. The user profile of a user provides information related to identity of the user, user attributes, user preferences, privileges assigned to the user, any robots registered to the user, privileges assigned to each of the robots registered to the user account, social contacts, etc. The information from the user profile is used to verify if the robot that user A is trying to register to their user account is already registered in the social media. The robot may already be registered to the user account of user A or not registered at all. Analyzing the information contained within the user profile of User A provides details of which robots are registered to user account of user A. Based on the analysis of the information, it may be noted that a plurality of robots (R.01 through R.06) are already registered to user A and robot (e.g., R.07) included in the current request is not registered to user A.

In addition to retrieving user account information of the user A, account information related to the robot may also be retrieved to determine if the robot is registered to another user. A robot account identifier module 353 is used to retrieve the user profile of the robot maintained in the social media. The user profile of the robot may be retrieved using one or more of the serial number, model number, make or brand, etc., of the robot. Information from the retrieved user profile of the robot may be used to determine the identity of the user to which the robot is currently assigned.

If it is determined that the robot is already assigned to a first user in the social media, the current request for registering the robot to user account of user A (i.e., second user) may, in some implementation, be to re-assign the robot from the first user to the second user. For example, the first user may have multiple robots assigned to the user account of the first user and the request to re-assign one of the robots to the second user may enable the robot to generate social interaction on behalf of the second user. In response to the request for registration, the robot is un-paired from the user account of the first user and paired to the user account of the second user by assigning some of the privileges of the second user.

FIG. 2B illustrates a simplified representation of one such implementation wherein the robot assigned to user A (e.g., user Bob) is re-assigned to a "friend" (e.g., user John) of user A, wherein the friend is identified as a social contact of user A in the social media. User A, Bob, may "introduce" the robot to his friend, John. This introduction would trigger retrieval of user profile information of both User A and friend from the social media server and analyzing the information. Based on the analysis of the user profile information, it can be seen, as illustrated in FIG. 2B-1, that the user account of user A is paired to robots R.01 through R.06 (303A-303F) and that no robots are paired to the user account of the friend. Useful information from the user profile of the friend may be used to re-assign the robot R.01 to the friend. Re-assigning the robot R.01 to the user account of the friend includes un-pairing the robot R.01 from the user account of user A and pairing the robot to the user account of the friend, as illustrated in FIG. 2B-2. After the re-assigning of the robot R.01, it is shown that user account of user A is now paired to robots R.02 through R.06 (303B through 303F) and that user account of the friend (i.e., John) is now paired to robot R.01.

Various implementations are discussed with reference to registering the robot to a social media and enabling social interaction in the social media using the robot. However, it should be noted that the various implementations are not restricted to pairing the robots for enabling social interaction in the social media but can be extended to using the robot to provide interactions to other interactive applications, including gaming application, etc.

As part of re-assigning the robot based on the information provided by the user profile retriever 352 and the robot account identifier 353, a robot profile generator module 354 is used to register the robot R.01 to the friend's user account or a new robot R.07 to user A's account. The server uses the identification information of the robot (e.g., make, model number, serial number, etc.), that uniquely identifies the robot during registration of the robot to the corresponding user account (e.g., user account of user A when registering a new robot R.07 for user A or user account of John when re-assigning the robot R.01 from user account of user A). As part of registering the robot, the robot is paired (i.e., linked) to the respective user account, so that the corresponding user profile, when viewed, would identify the association of the robot as being associated with the user.

Referring back to FIG. 2A, after registering the robot to the user account of user A, privileges for the robot are set based on input provided by the user A. In some implementations, the privileges assigned for the new robot (e.g., R.07)

are different from the privileges assigned to other robots (R.01-R.06) that are associated with user A, wherein the privileges assigned to the robot R.07 and to other robot(s) associated with the user account of user A are a sub-set of the privileges assigned to the user A. Assigning a sub-set of the privileges of the user to the robot would provide the robot with access to some of the social interactions of the user but not all, thereby providing some amount of privacy for the user in the user account. Further, the subset of privileges ensures that the human user and not the robot has complete control of the user account of user A. Providing all of the privileges may cause the robot to control the user account of the user, which can lead to the robot potentially "hijacking" the user account of the user, starting its own social network, and preventing the user from accessing their user account. The privileges assigned to the robot are sufficient to allow the robot to have freedom to generate its own social interactions (e.g., social interactions in relation to the robot condition, etc.) that are different from the social interactions of the user. While defining privileges for the robot, the user may consider the amount of deviation in the social interactions of the robot that can be tolerated and control the social interactions of the robot by defining a social similarity index setting for the robot.

The privileges and limitation settings for the robot are used by the robot profile generator module 354 to define the profile of the robot and for generating a user account for the robot to complete the registration of the robot to user account. The robot is then allowed to generate social interactions by accessing the user account of the user or by accessing the social interactions related to the user account from within the user account of the robot.

Social interactions generated by the robot are received by the social interaction analyzer module 355 and verified to ensure that the social interactions are from the robot assigned to the user, and that the social interactions are in accordance to the privileges assigned to the user account of the robot. The social interactions are further analyzed to ensure that the social interactions are directed toward social contacts defined for the robot. The social interaction analyzer module 355 may use the access control list (ACL) 355B to determine if the social interaction is directed toward or is in response to social interactions initiated by the social contacts of the user defined in the ACL. The robot may use artificial intelligence (AI) learning to learn from the social interactions generated by the user, and as part of the learning, the robot determines the type of social interactions generated by the user, the topics the user prefers, type and frequency of social interactions with certain social contacts of the user, etc., and uses this learning when generating social interactions at the user account of the user or the robot.

In some cases, social interactions may be specific to the robot (e.g., workings of the robot, conditions of various sensors or parts of the robot, such as hot, malfunction, wheels broken, sensor 1 not working, etc.), and may not be related to or similar to any social interactions generated by the user or social contacts of the user. Content of each social interaction generated by the user are analyzed by the social interaction analyzer module 355 using social similarity index setting 355A to ensure that the robot does not provide content that deviates from the content posted by the user beyond the similarity index setting 355A defined for the robot. Based on the analysis, the social interactions generated by the robot are posted to social stream of one or more users and/or social contacts of the users and updated to the corresponding social activity grids of the respective user, the robot, and the social contacts that receive from the social activity grid updater module 356 the social interaction generated by the robot.

Initially, user A will have their own profile that defines the privileges assigned to user A. User A will have their own social activities grid. When a robot is associated with user A, the robot will start with a subset of the privileges assigned to user A and a subset of the social activities of user A. Over time, based on the social interactions generated by the robot in the social media on behalf of the user A and on its own, the social activity grid of the robot will gradually evolve to reflect the deviations of the social activities of the robot from the social activities of the user. For example, when the robot R.01 associated with user A generates social activities on its own, the social activity grid of the robot may extend outside of user A's social activity grid and the amount of deviation in the social activity grid of the robot is controlled by the social similarity index setting. As the robot begins to deviate outside the social activity grid of user A beyond the social similarity index setting defined for the robot, the social activity of the robot is evaluated and the social similarity index is adjusted to ensure that there is sufficient overlap in the social activity grid of the robot with the social activity grid of the user A.

FIGS. 4A, 4B-1 through 4B-4 illustrate an example of social activity grid of the user and the deviation in the social activity grid of the robot with respect to that of the user that the robot is associate with. FIG. 4A illustrates the social activity history of user A captured over time. The social activity grid of user A may include activities covering a wide range of topics, such as politics, sports, family, friends, shopping, etc. The robot R.01 of user A adopts a subset of the privileges of user A and hence a subset of the social activity grid of user A.

FIG. 4B-1 illustrates the social activity grids of user A and of the robot R.01 at time $t_0$. From the illustration it can be seen the social activity grid of the robot is 100% contained within the social activity grid of user A. Meanwhile, the social similarity index of the robot is set to be greater than or equal to 60%.

FIG. 4B-2 illustrates the social activity grids of user A and robot R.01 at time $t_1$. As can be seen from the social activity grids, the social activity of the robot has evolved from time $t_0$ to $t_1$ but continues to 100% overlap a portion of the social activity grid of user A. However, the area of overlap has shifted from time $t_0$ to $t_1$ due to the shift in the social activity topics generated by the robot. FIG. 4B-3 illustrates an example of the social activity grids of the robot R.01 and user A captured at time $t_N$, wherein the social activity grid of the robot R.01 has deviated substantially from the social activity grid of user A. Evaluating the social activities of the robot R.01 at time $t_N$ shows that the social similarity index of the robot R.01 is at 40% that is beyond the social similarity index setting of the robot R.01 of 60%. In some implementation, based on the evaluation, the social activity or activities of the robot that caused the deviation may be ignored and not posted to the social streams of the user A, the robot R.01 and the social contacts of the user nor included in the social activity grid of the robot, user A. In other implementations, certain number of the social activities of the robot that caused the deviation may be posted to the social streams of user A, social contacts, and updated to the respective social activity grids of the user, the robot, and social contacts. After allowing the posting of a pre-defined number of such activities, any other social activity of the robot that causes the deviation may be ignored. For example, the robot may be allowed to generate social activities related to the robot itself, including the workings of the robot, status of the various sensors, status of various resources of the robot, etc. Such activities are outside the activities registered for the user. However, if the robot continues to generate such activities, or deviates from the topics or content preferred by the user, the social similarity index setting would cause the social media server to ignore such activities of the robot. The social similarity index setting thus provides some level of deviation for the robot and at the same time ensures that some level of similarity exists between the social activities of the robot and social activities of the user.

In some implementations, the social similarity index setting of the robot may be dynamically adjusted at any time by the user A. Consequently, the social activity of the robot R.01 is analyzed periodically or continuously and based on the analysis, the social activity of the robot is either ignored or is updated to the corresponding social activity grids of user A, robot R.01 and to social streams of social contacts of the user A. The social activity grid of a user or a robot can be used to determine various metrics of the social activity, such as number of posts the user has generated, frequency of access, posting frequency, posting topics, type of content provided, social contacts the user interacts with or provides content to, etc. Even when user A is not very socially active, user A may allow the robot to be socially active on behalf of user A by sharing the privileges (identifying the preferences of user A) while ensuring that the robot does not deviate too much from the user A's social activity grid. When the user A senses that the robot R.01 continues to deviate too much from the social activity grid of user A, user A may be able to control the social activity of the robot by adjusting the social similarity index setting. FIG. 4B-4 illustrates an example representation of a temporal snapshot of the social activity grids of the user A and the robot R.01 with the social similarity index setting adjusted to a higher percentage (from 60% as illustrated in FIGS. 4B-1 and 4B-2) to 90%. As a result, as shown in FIG. 4B-4, the social activity grid of the robot substantially overlaps the social activity grid of user A. The AI of the robot allows the robot to move around in the social activity grid of user A and ensures that the amount of deviation is within the acceptable level defined by the social similarity index setting.

FIGS. 5A and 5B illustrate example social activity streams of user A and of the robot, respectively. For example, as shown in FIG. 5A, the initial post is generated by user A and discusses weather condition in geo location 1. In response to the initial post by user A, a social contact (e.g., user B) of user A posts a response. Additionally, robot R.01 associated with user A accesses the social media account of user A and generates a post that relates to the weather posting of user A. Alternately, the robot R.01 accesses the robot's own social media account that shows the weather post from user A and generates a post providing additional information about the weather in geo location 1, such as highest temperature recorded for the geo location, weather forecast for next 7 days, graphs, pictures etc., gathered from the Internet related to the weather at the geo location 1. The additional information is presented as augmented content for the weather posting of user A. As previously mentioned, the robot R.01 is not restricted to generating posts in response to specific posts of user A but may also independently generate posts related to specific event, specific geo location, etc., and include pictures taken for the specific event, geo location, etc. Additionally, the robot may also independently generate posts related to condition of the robot, such as temperature of one or more components of the robot, any system or component malfunctions detected at the robot (e.g., a component not working, right front wheel not turning, left back wheel broken, etc.), status of storage space, etc. The information or content generated by the robot R.01 can include textual content, image content, video content, audio content, graphical user interface content, etc. The generated post of the robot is updated to social media streams of user A, the robot R.01 and one or more social contacts of user A, along with an indicator to indicate that the post was generated by the robot R.01 on behalf of user A.

In another example, user A may receive a social media post from a friend that includes pictures taken while the friend was vacationing in Hawaii. The robot accessing the social media account of user A may act on behalf of user A when responding to the social media post of the friend, and generate a post on behalf of user A, as illustrated in FIG. 5B, that includes details of user A's previous trip to Hawaii and some pictures taken by user A while vacationing in Hawaii or providing details of user A's vacation trip to any other place. The post generated by the robot is updated to the social activity grid of the user, the robot, of the friend as well as other social contacts of the friend or of the user after verifying against the ACL and the similarity index setting of the robot. Every post (i.e., social activity) generated by the robot is analyzed and the user profile of the robot is refined based on the generated postings of the robot. The refinement in the user profile of the robot follows similar path followed in relation to the detection of divergence in the social activity of the robot, wherein the user profile is allowed to be refined up to a point defined in the similarity index setting after which the user profile of the robot is not refined.

When generating the posts, the robot relies on the AI logic of the robot to learn user A's preferences on subjects and social contacts, posting frequency, type and quality of content, etc., from the various social activities generated by the user and use this learning when generating content on its own or on behalf of user A. In some implementations, the AI logic in the robot R.01 may communicate with additional AI logic that is on the social media server to perform other functions.

Figure 6A:
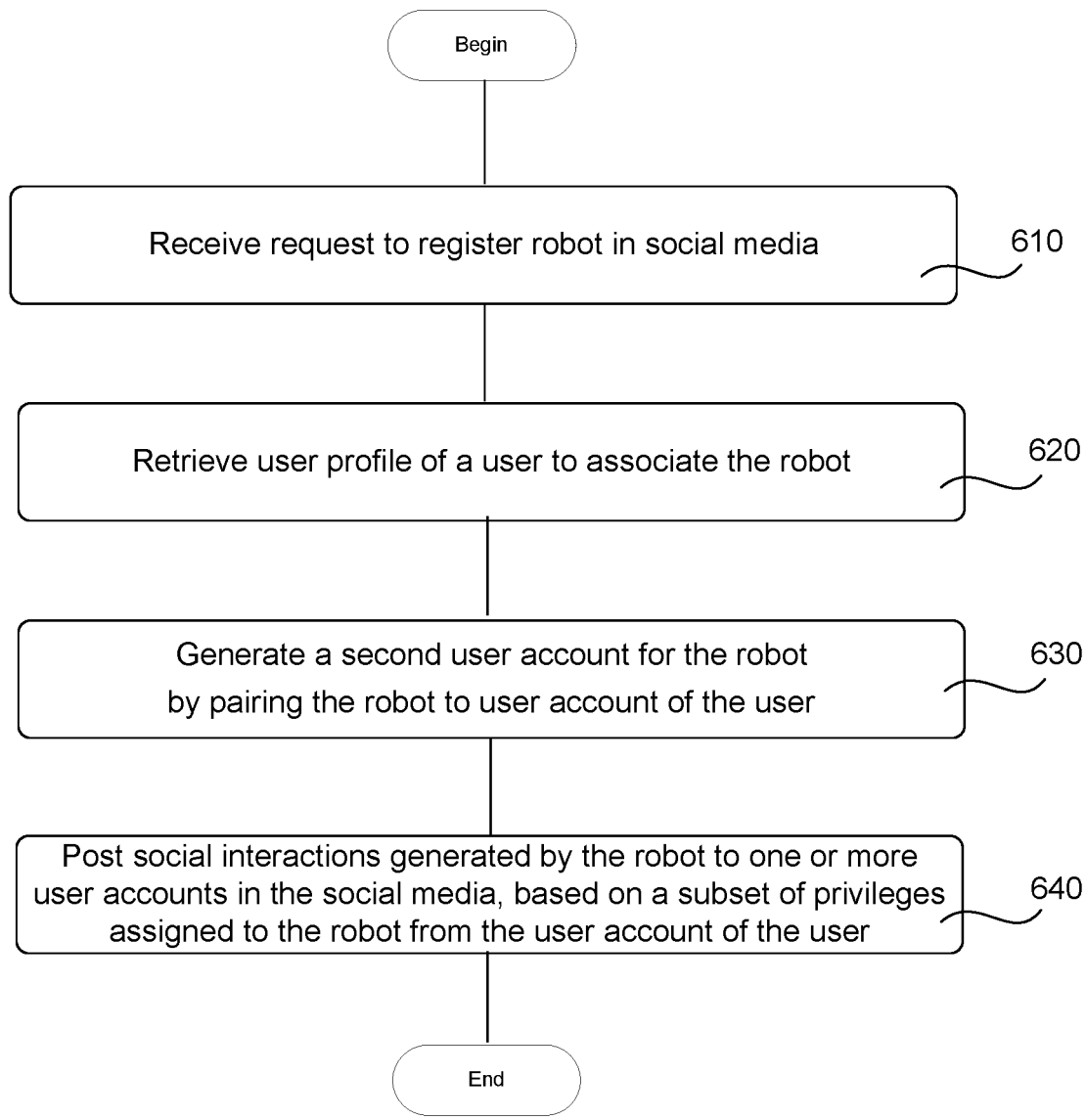
FIG. 6A illustrates process operations of a method that is used to define a social media account for a robot of a user and to receive social interactions from the robot in the social media, in accordance with an implementation of the invention.

FIG. 6A illustrates operations of a method for registering a robot in social media and posting social interactions generated by the robot to one or more user accounts in the social media, in one implementation. The method begins at operation 610, when a request to register the robot in the social media, is received. The request may be from a user account of user A and may be generated from a client device of the user A.

In response to the request, the social media server may retrieve user profile of the user A to whom the robot is to be associated, as illustrated in operation 620. The user profile of user A provides various metrics associated with the user A including privileges assigned to user A for initiating social connections, interacting in the social media, preferences with regards to the type and quality of content, and restrictions placed for the social interactions generated in the social media, to name a few. Useful information are retrieved from the user profile of user A.

A second user account is generated for the robot by pairing the robot to user account of the user A, as illustrated in operation 630. The pairing of the robot includes identifying a subset of the privileges assigned to the user and assigning the subset of privileges to the user account of the robot. The subset of privileges assigned to the robot provides the robot with access to at least some of the social interactions of the user A in the social media.

Upon generating the second user account for the robot in the social media, the robot is allowed to generate social interactions on behalf of the user A to whom the robot is associated. The social interactions generated by the robot are evaluated to ensure that they comply with the subset of privileges assigned to the robot prior to posting the social interactions to one or more user accounts in the social media, as illustrated in operation 640. The generated social interactions provide content that is used to augment content generated by user A or to respond on behalf of the user A to other social interactions provided by other users (i.e., social contacts of user A).

Figure 6B:
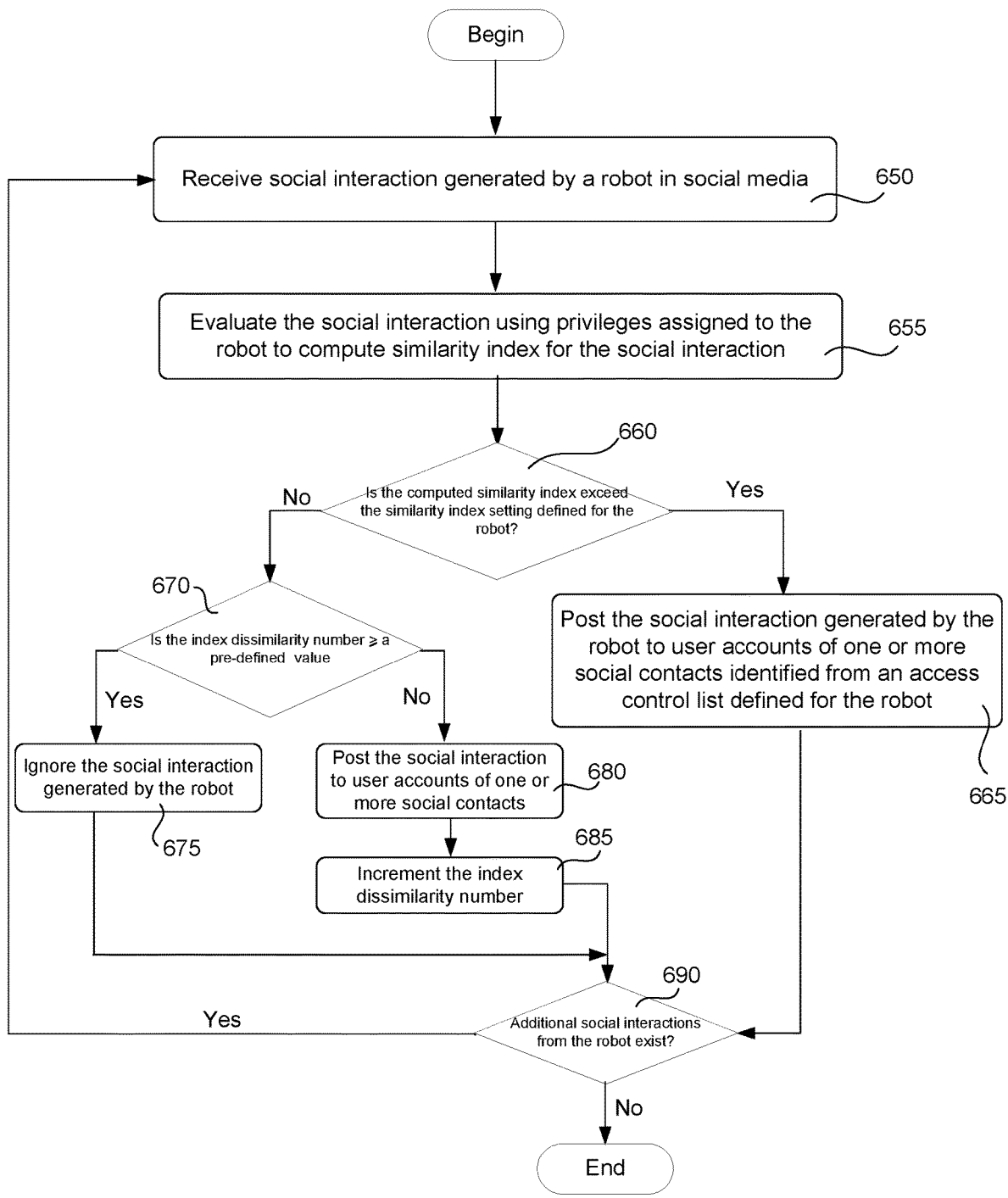
FIG. 6B illustrates process operations of a method that is used to receive social interactions from a robot for a user account, in accordance with an alternate implementation of the invention.

FIG. 6B illustrates operations of a method for interacting in a social media using a robot, in one implementation. The method begins at operation 650, wherein a social interaction generated by a robot is received at a user account of a user defined in the social media, wherein the robot is paired to the user account of the user in the social media. The pairing of the robot includes creating a user account for the robot and assigning a subset of privileges from the user account of the user. The subset of privileges enables the robot to access at least some of the social interactions available in the user account of the user. The social interaction generated by the robot may be in response to a social interaction from a social contact of the user or in response to a post by the user or may be to provide information on the conditions of the robot.

The social interaction generated by the robot is evaluated, as illustrated in operation 655, to determine if the social interaction is in compliance with privileges assigned to the robot in the social media. To determine the compliance of the social interaction to the assigned privileges, a similarity index is computed for the social interaction generated by the robot. The similarity index may identify a level of overlap in the topic, the type of content included in the social interaction, the content quality, the frequency of response, or any other metrics of the social interaction, to the social interaction generated by the user.

The computed similarity index is then compared against a similarity index setting defined for the robot to determine if the similarity index exceeds or is below the similarity index setting, as illustrated by decision box 660. The similarity index setting defined for the robot defines a level of overlap in the social interaction generated by the robot with the social interaction generated by the user. Greater the overlap, more similar the social interaction generated by the robot will be to the social interaction generated by the user. As the robot is acting on behalf of the user, the social interaction generated by the robot is evaluated to ensure that the social interaction has some amount of similarity to a social interaction generated by the user or at least complies with the response standards defined for the robot by the user in the social media.

If the similarity index computed for the social interaction exceeds the similarity index setting for the robot, the process flows to operation 665, wherein the social interaction generated by the robot is posted to user accounts associated with one or more social contacts identified from an access control list defined for the robot. The access control list for the robot is defined to include a subset of social contacts defined for the user account of the user and, in some implementations, may also include robots associated with the one or more social contacts. The process then proceeds to decision box 690, wherein it is determined if additional social interactions generated by the robot exist.

If, however, at decision box 660, the computed similarity index for the social interaction generated by the robot falls below the similarity index setting defined for the robot, then the process flows to a second decision box 670, wherein a decision is made about the index dissimilarity number. Index dissimilarity number identifies a number of social interactions generated by the robot that falls below the similarity index setting (i.e., the social interaction does not meet the similarity standard (e.g., 70%) set by the user). When the computed index dissimilarity number is greater than or equal to a pre-defined value, the process flows to operation 675 wherein the social interaction generated by the robot is ignored and the process flows to decision box 690.

As mentioned earlier, the robot is allowed to generate social interactions of its own (e.g., to inform the user of the condition of various components of the robot), which may not be similar to social interactions generated by the user. The current condition of the robot may be important to the user. As a result, certain number of the social interactions generated by the robot providing details of the current condition of the robot may be posted to the user account of the user and, in some implementation to user accounts of one or more social contacts of the user. The user may restrict the number of such social interactions that can be posted to the user account by specifying an upper limit (i.e., pre-defined value). Thus, when the social interaction generated by the robot is received, the index dissimilarity number is compared against the pre-defined value.

When the index dissimilarity number associated with the social interaction is less than the pre-defined value, the social interaction generated by the robot is posted to user account of the user, as illustrated in operation 680. After posting the social interaction, the process flows to operation 685 wherein the index dissimilarity number is incremented. The process then proceeds to decision box 690, wherein it is determined if additional social interactions generated by the robot exist. If additional social interactions generated by the robot exist, the process returns to operation 650 to receive and process the social interactions. If, on the other hand, additional social interactions do not exist, the process ends.

The various implementations described herein discuss how a robot can be configured to connect to social media of a user to get to know the friends (i.e., social contacts) of the user and to get information about the friends. The robot, in order to get access to friends' information, is formally "introduced" by the user to the user's friends by providing the robot with access to the user account on the social media and, in some implementation, generating a post introducing the robot to one or more social contacts of the user. Once the robot is formally introduced, the robot can have its own profile and generate an emotional connection to the user. The robot is also able to socially connect to other robots associated with the user (if there is more than one robot associated with the user), to the friends (i.e., social contacts) of the user, and to other robots associated with the friends of the user, by accessing the user's social media account and using information (such as topics the user likes or dislikes, social posting preferences, frequency of posting, social contacts (including black list of friends, white list of friends), etc.) from the user's social media account.

The AI logic in the robot identifies the various activities the user is involved in over a period of time, learns the user's preferences, likes, behavioral attributes, etc., through periodic evaluation of social interactions generated by the user in the social media and other online applications, and uses such learning during social interactions on behalf of the user. The various implementations are not restricted to social media but can be extended to other interactive applications, as well. For example, the robot may be used for providing interactions on behalf of the user when playing online games or when interacting with other online applications. The robot may learn from the user's game play history to determine the user's preferences, interaction styles, skill levels, etc., and use such learning when providing interactions on behalf of the user. The AI logic of the robot may use game logic that provides the details of the game including how the game progresses at different stages of game play and use this information to provide tips as feedback to the user to allow the user to progress in the game. The tips provided to the user may be tailored to the user based on the user's skill level. As the user's game playing skills improve, the feedback may be adjusted to match the user's improved skill level. Thus, the AI logic of the robot can be used to provide social interaction and other types of interactions including tips to train the user or tips to interact with any interactive online application and is therefore not restricted to social interaction in social media. Other advantages of the various implementations may be envisioned by one skilled in the art.

Figure 7:
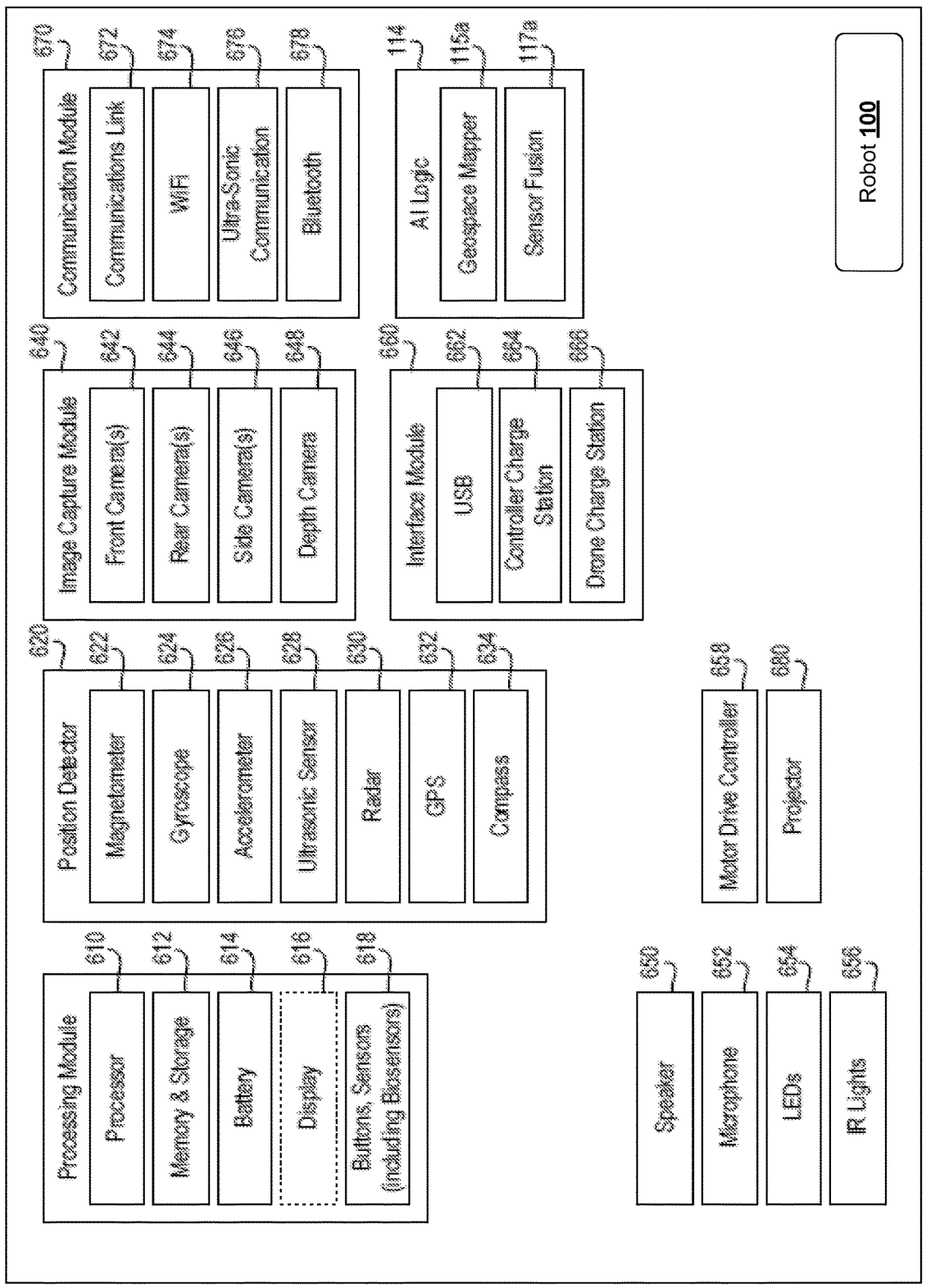
FIG. 7 illustrates a simplified representation of various modules within the robot that are used for various implementations of the invention.

With reference to FIG. 7, a diagram illustrating components of a robot 100 is shown, in accordance with one implementation. The robot includes a processor 610 for executing program instructions. A memory 612 is provided for storage purposes, and may include both volatile and non-volatile memory. An optional display 616 is included which provides a visual interface that a user may view. A battery 614 is provided as a power source for the robot 100. In addition to the battery, the robot 100 may be mounted on a wheel-base which may also act as a charger to charge the robot. A position detector module 620 may include any of various kinds of motion sensitive hardware, such as a magnetometer 622, a gyroscope 624, an accelerometer 626, an ultrasonic sensor 628, a radar 630, a GPS 632 and a compass 634.

An accelerometer 626 is a device for measuring acceleration and gravity induced reaction forces. Single and multiple axis models are available to detect magnitude and direction of the acceleration in different directions. The accelerometer is used to sense inclination, vibration, and shock. In one embodiment, multiple accelerometers 626 (e.g., 3 accelerometers) are used to provide the direction of gravity, which gives an absolute reference for two angles (world-space pitch and world-space roll).

A magnetometer 622 measures the strength and direction of the magnetic field in the vicinity of the robot. In one embodiment, three magnetometers 622 are used within the robot, ensuring an absolute reference for the world-space yaw angle. In one embodiment, the magnetometer 622 is designed to span the earth magnetic field, which is ±80 microtesla. Magnetometers 622 are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope 624 or the camera. In one embodiment, accelerometer 626 is used together with magnetometer 622 to obtain the inclination and azimuth of the robot 100.

A gyroscope 624 is a device for measuring or maintaining orientation, based on the principles of angular momentum. In one embodiment, three gyroscopes 624 provide information about movement across the respective axis (x, y and z) based on inertial sensing. The gyroscopes 624 help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

An ultrasonic sensor 628 is a device that can measure the distance of an object by using sound waves. It measures distance by sending out a sound wave at a specific frequency and listening for that sound wave to bounce back. By recording the elapsed time between the sound wave being generated and the sound wave bouncing back, it is possible to calculate the distance between the ultrasonic sensor and the object.

A radar 630 is an object-detection system that uses radio waves to determine the range, angle, or velocity of objects. A radar system consists of a transmitter for generating electromagnetic waves in the radio or microwaves domains, a transmitting antenna, a receiving antenna, a receiver and a processor to determine the properties of the object(s). Radio waves (pulsed or continuous) from the transmitter reflect off the object and return to the receiver, giving the information about the object's location and speed.

A global positioning system (GPS) 632 is a space-based radio-navigation system that provides geo-location and time information to a GPS receiver on any device. The system does not require any data to be transmitted but requires an object to be at least in the line of sight of at least four GPS satellites.

A magnetic compass 634 is an instrument used to determine direction relative to geographic cardinal directions. A magnetic needle of the compass is aligned to the Earth's magnetic field, whereby a torque exerted by the magnetic field on the needle pulls the north point or pole of the needle toward the Earth's north magnetic pole and the opposite end toward the south magnetic pole.

An image capture module 640 is provided for capturing images and image streams of a real environment. More than one camera may be included in the robot 100, including one or more front cameras 642 mounted on the front face of the robot 100, one or more rear-facing cameras 644 mounted on the read face of the robot 100, and one or more side cameras 646 that are mounted on the lateral sides of the robot. Additionally, one or more depth cameras 648 may be included in the robot 100 for capturing depth information of objects in a real environment.

The robot 100 includes speakers 650 for providing audio output. Also, a microphone 652 may be included for capturing audio from the real environment, including sounds from the ambient environment, commands provided by the user, etc. The microphone 652 may be a microphone array that has the capability to focus on sounds from specific direction by filtering out other ambient sounds.

LEDs 654 are provided as visual indicators of statuses of the robot 100. For example, an LED may indicate battery level, power on, etc. IR lights 656 are provided to enable detection of objects when visible light is not available. Motor drive controller 658 is used to control movement of the robot. The motor drive controller 658 is connected to wheels or treads or other mechanism used for moving the robot and includes motor means to move the robot in specific directions, regulate the speed, limit torque, and for overall navigation of the robot in a geo location. An interface module 660 includes various sub-modules that are used to provide an interface for one or more devices. A USB interface 662 is included as one example of an interface for enabling connection of peripheral devices, or connection to other devices, such as other portable devices, computers, etc. In various implementations of the robot 100, any of various kinds of interfaces may be included to enable greater connectivity of the robot 100. A controller interface is included as an example of an interface for enabling receiving and charging of one or more controllers. A drone interface may be included for enabling receiving and charging of a drone device. The drone device may include a camera in its body and can be deployed from the robot to capture a overhead view of the geo location in which the robot is located. The overhead view may be used to generate a three-dimensional mapping of the space in the geo location, which can be used to move and position the robot in relation to a user or an object of interest.

A communication module 670 may be used to provide various communication links to different devices within the system. For example, a communications link 672 may be included for connection to other devices. In one embodiment, the communications link 672 utilizes infrared transmission for wireless communication. In other embodiments, the communications link 672 may utilize any of various wireless or wired transmission protocols for communication with other devices. A WiFi module 674 is included for enabling connection to the Internet via wireless networking technologies. An ultra-sonic communications 676 is included to facilitate communication with other devices using ultra-sonic technologies. A Bluetooth module 678 is included for enabling wireless connection to other devices. A projector 680 is included for enabling the robot to project images of content identified for the user on to a display surface identified in the geo location. The projector 680 may include logic to evaluate the display surface on which the images of content are to be projected to ensure that the display surface is conducive for projection (e.g., is not highly reflective) prior to projecting the images.

Input buttons/sensors 618 are included to provide an input interface for the user. Any of various kinds of input interfaces may be included, such as buttons, touchpad, joystick, trackball, touch screen, keypad, etc.

Bio-sensors 618 are included to enable detection of physiological (i.e., biometric) data from a user. In one embodiment, the bio-sensors 618 include one or more dry electrodes for detecting bio-electric signals of the user through the user's skin.

AI logic 114 is included to enable the robot to detect presence of a user from signals received from various sensors, map the space in the geo location of the robot, position the robot to an area proximate to the user based on the mapped space, monitor the user in the geo location, capture images of the user performing an activity and provide feedback. The feedback uses machine learning algorithm to detect activity performed by the user, intelligently identify the changes that is to be performed by the user and provide instructions to the user to perform the change. A geo space mapper 115a is included in the AI logic 114 to map the space in the geo location in either a 2-dimensional or 3-dimensional format. A sensor fusion module 117a is included in the AI logic to merge data obtained from various sensors and to intelligently generate a model of a user based on the data from the various sensors.

The foregoing components of robot 100 have been described as merely exemplary components that may be included in robot 100. In various embodiments of the invention, the robot 100 may or may not include some of the various aforementioned components. Embodiments of the robot 100 may additionally include other components not presently described, but known in the art, for purposes of facilitating aspects of the present invention as herein described.

It will be appreciated by those skilled in the art that in various embodiments of the invention, the aforementioned handheld device may be utilized in conjunction with an interactive application displayed on a display to provide various interactive functions. The exemplary embodiments described herein are provided by way of example only, and not by way of limitation.

Figure 8:
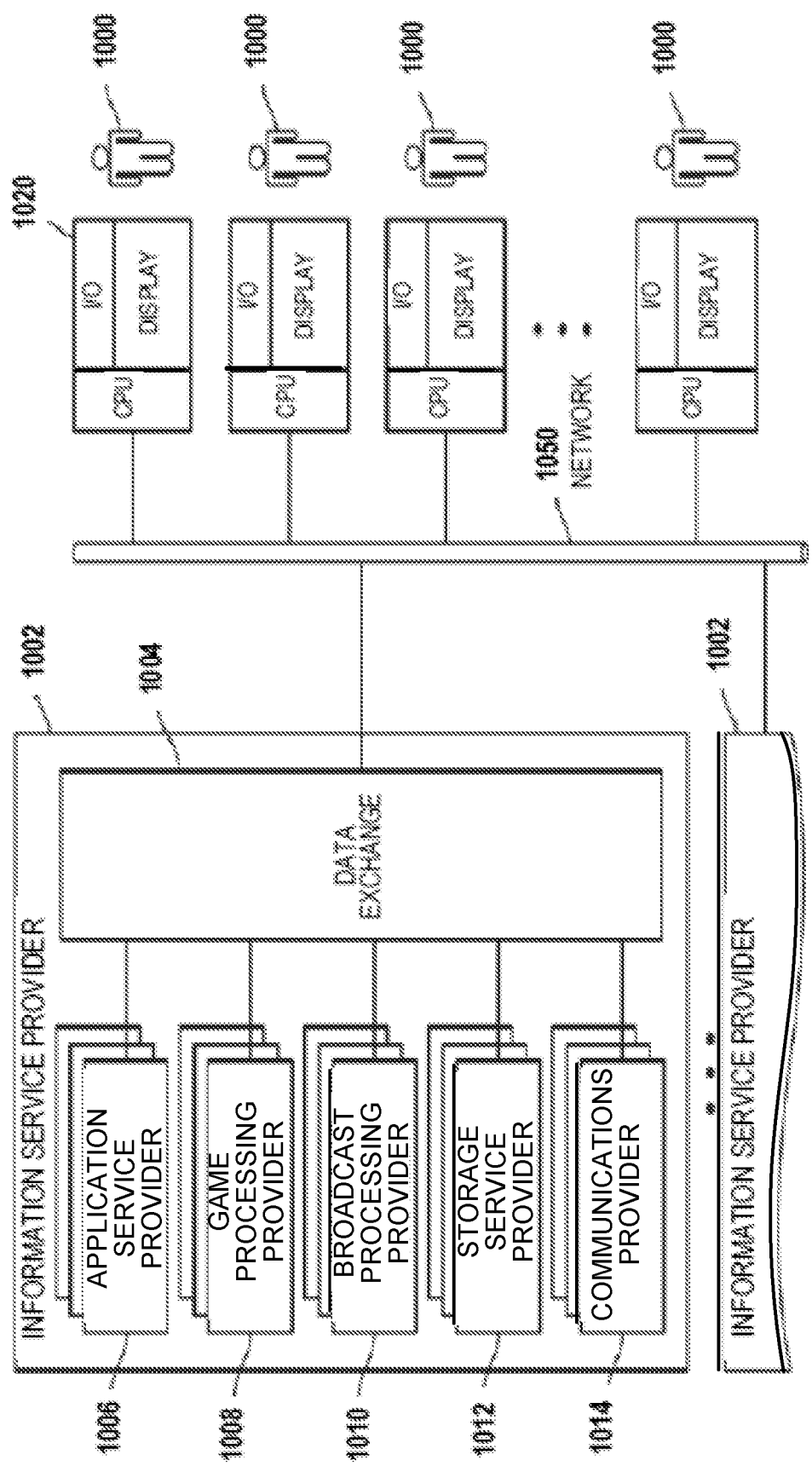
FIG. 8 illustrates an exemplary Information Service Provider architecture for delivering informational content and services to users who are geographically dispersed and connected via network, in accordance with one implementation of the present invention.

FIG. 8 illustrates an implementation of an Information Service Provider architecture that may be used in providing access to different online applications. Information Service Providers (ISP) 1002 deliver a multitude of information services to users 1000 geographically dispersed and connected via network 1050. Although the various implementations have been discussed with reference to providing fast access to online applications, such as games, the implementations can be extended to provide one or more types of other services. For example, an ISP can deliver just one type of service, such as an exercise routine, or a variety of services such as physical fitness routines, games, and other user-preferred content updates. Additionally, the services offered by each ISP may be dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data from the user's gaming or access profile to the new ISP through the connection module, such that the user information "follows" the user to the new city making the data closer to the user and easier to access. In another implementation, a master-server relationship may be established between a master ISP, which manages the information for the user, and a server ISP that interfaces directly with the user under control from the master ISP. In another implementation, the data is transferred from one ISP to another ISP (i.e., during switching of data center assigned to the user) as the client moves around the world and such transfer may be based on a compatibility of services provided by the respective ISPs to make the ISP 10002 in better position to service the user be the one that delivers these services.

ISP 1002 includes Application Service Provider (ASP) 1006, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on a vendor's system, for example, and is accessed by users through a web browser using HTML, or by a special purpose client software provided by the vendor, or via other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 1002 includes an interactive application server, such as a Game Processing Server (GaPS) 1008 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another implementation, the GaPS establishes communication between the players and their respective game-playing devices exchange information without relying on the centralized GaPS.

Dedicated GaPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 1010 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 1012 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 1014 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 1004 interconnects the several modules inside ISP 1002 and connects these modules to users 1000 via network 1050. Data Exchange 1004 can cover a small area where all the modules of ISP 1002 are in close proximity, or can cover a large geographic area when the different modules are geographically dispersed. For example, Data Exchange 1004 can include a fast Gigabit Ethernet (or faster) within a cabinet of a data center, or an intercontinental virtual area network (VLAN).

Users 1000 access the remote services with client device 1020, which includes at least a CPU, a memory, a display and I/O. The client device can be a PC, a mobile phone, a netbook, tablet, gaming system, a PDA, etc. In one implementation, ISP 1002 recognizes the type of device used by the client and adjusts the communication method employed. In other cases, client devices use a standard communications method, such as HTML, to access ISP 1002.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. Alternately, the computer readable code may be downloaded from a server using the data exchange interconnects described above. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present implementations are to be considered as illustrative and not restrictive, and the invention is not to be limited to the details given herein, but may be modified within the scope and equivalents of the described implementations.

An exemplary overall system architecture of a gaming console is described herein. An example gaming console may include a Sony® Playstation 3® (PS3) or a Playstation 4® (PS4) entertainment device, which may be compatible with controllers for implementing an embodiment of the present invention. Although the PS3 gaming console system architecture is explained in detail, it should be noted that the various implementations described herein can be extended to system architecture of a different gaming console or computing device. A system unit is provided, with various peripheral devices connectable to the system unit. The system unit is similar to the cloud gaming system 300 of FIG. 1. The system unit comprises: a processor, which may be a 8 core processor, as in PS3, or a multi-core processor, as in PS4; a Rambus® dynamic random access memory (XDRAM) unit, as in PS3, or a graphics dynamic random access memory, such as a GDDR5, as in PS4; a Reality Synthesizer graphics unit (e.g., 550 MHz GPU) with a dedicated video random access memory (VRAM) unit, as in PS3, or 800 or 900 MHz GPU with shared graphics memory in PS4 and PS4 Pro; and an I/O bridge. The system unit also comprises a Blu Ray® Disk Read Only Memory (BD-ROW)) (optical) disk reader for reading from a disk and a removable slot-in hard disk drive (HDD), accessible through the I/O bridge. Optionally the system unit also comprises a memory card reader for reading compact flash memory cards, Memory Stick® memory cards and the like, which is similarly accessible through the I/O bridge and in PS4, a built-in DVR to record games.

The I/O bridge also connects to six Universal Serial Bus (USB) 2.0 ports; a gigabit Ethernet port; an IEEE 802.11b/g wireless network (Wi-Fi) port; and a Bluetooth® wireless link port capable of supporting of up to seven Bluetooth connections.

In operation the I/O bridge handles all wireless, USB and Ethernet data, including data from one or more game controllers (DualShock 3 controller, as in PS3, or a PS4 DualShock 4 controller, as in PS4, etc.). For example when a user is playing a game, the I/O bridge receives data from the game controller via a Bluetooth link and directs it to the processor (in PS3) or multi-core processor (in PS4), which updates the current state of the game accordingly. Further, other image and move sensors provide data captured during game play of the user, to the I/O bridge, which directs it to the respective processor. The game controllers (e.g., game controllers of PS4) include a share button option for sharing a game, a clickable touchpad, a rechargeable battery (lithium-ion or other type), etc.

The wireless, USB and Ethernet ports also provide connectivity for other peripheral devices in addition to game controllers, such as: a remote control; a keyboard; a mouse; a portable entertainment device such as a Sony Playstation Portable® entertainment device; a video camera such as an EyeToy® video camera; a microphone headset; and a removable hard drive. Such peripheral devices may therefore in principle be connected to the system unit wirelessly; for example the portable entertainment device may communicate via a Wi-Fi ad-hoc connection, whilst the microphone headset may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader may be connected to the system unit via a USB port, enabling the reading of memory cards of the kind used by the Playstation® or Playstation 2® devices.

In the present implementation, the game controller is operable to communicate wirelessly with the system unit via the Bluetooth link. However, the game controller can instead be connected to a USB port, thereby also providing power by which to charge the battery of the game controller. In addition to one or more analog joysticks and conventional control buttons, the game controller is sensitive to motion in six degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control is also operable to communicate wirelessly with the system unit via a Bluetooth link. The remote control comprises controls suitable for the operation of the Blu Ray™ Disk BD-ROM reader and for the navigation of disk content.

The Blu Ray™ Disk BD-ROM reader is operable to read Compact Disc, read only memory (CD-ROMs) compatible with the Playstation and PlayStation 2 devices, in addition to conventional pre-recorded and recordable compact discs (CDs), and so-called Super Audio CDs. The Blu Ray™ Disk BD-ROM reader is also operable to read Digital versatile disc-read only memory (DVD-ROMs) compatible with the Playstation2™ and PlayStation 3™ devices, in addition to conventional pre-recorded and recordable DVDs. The Blu Ray™ Disk BD-ROM reader is further operable to read BD-ROMs compatible with the Playstation 3 device, as well as conventional pre-recorded and recordable Blu-Ray Disks.

The system unit is operable to supply audio and video, either generated or decoded by the Playstation 3 or Playstation 4 device via the Reality Synthesizer graphics unit, through audio and video connectors to a display and sound output device such as a monitor or television set having a display and one or more loudspeakers. The audio connectors may include conventional analogue and digital outputs whilst the video connectors may variously include component video, S-video, composite video and one or more High Definition Multimedia Interface (HDMI) outputs. Consequently, video output may be in formats such as PAL or NTSC, or in 720p, 1080i or 1080p high definition and 4K, HDR.

Audio processing (generation, decoding and so on) is performed by the Processor. For example, the Playstation 3 device's operating system supports Dolby® 5.1 surround sound, Dolby® Theatre Surround (DTS), and the decoding of 7.1 surround sound from Blu-Ray® disks.

In the present implementation, the video camera includes a CMOS (Complementary Metal Oxide Semiconductor)

image sensor (although a charge-coupled device (CCD) image sensor may also be used), an LED indicator, and hardware-based real-time data compression and encoding apparatus so that compressed video data may be transmitted in an appropriate format such as an intra-image based MPEG (motion picture expert group) standard for decoding by the system unit. The camera LED indicator is arranged to illuminate in response to appropriate control data from the system unit, for example to signify adverse lighting conditions. Implementations of the video camera may variously connect to the system unit via a USB, Bluetooth or Wi-Fi communication port. Implementations of the video camera may include one or more associated microphones and also be capable of transmitting audio data. In implementations of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit, an appropriate piece of software such as a device driver should be provided. Device driver technology is well-known and will not be described in detail here, except to say that the skilled man will be aware that a device driver or similar software interface may be required in the present implementation described.

The Processor has an architecture comprising four basic components: external input and output structures comprising a memory controller and a dual bus interface controller; a main processor referred to as the Power Processing Element; eight co-processors referred to as Synergistic Processing Elements (SPEs); and a circular data bus connecting the above components referred to as the Element Interconnect Bus. The total floating point performance of the Processor is 218 GFLOPS, compared with the 6.2 GFLOPs of the Playstation 2 device's Emotion Engine.

The Power Processing Element (PPE) is based upon a two-way simultaneous multithreading Power compliant PowerPC core (PPU) running with an internal clock of 3.2 GHz. It comprises a 512 kB level 2 (L2) cache and a 32 kB level 1 (L1) cache. The PPE is capable of eight single position operations per clock cycle, translating to 25.6 GFLOPs at 3.2 GHz. The primary role of the PPE is to act as a controller for the Synergistic Processing Elements, which handle most of the computational workload. In operation the PPE maintains a job queue, scheduling jobs for the Synergistic Processing Elements and monitoring their progress. Consequently each Synergistic Processing Element runs a kernel whose role is to fetch a job, execute it and synchronized with the PPE.

Each Synergistic Processing Element (SPE) comprises a respective Synergistic Processing Unit (SPU), and a respective Memory Flow Controller (MFC) comprising in turn a respective Dynamic Memory Access Controller (DMAC), a respective Memory Management Unit (MMU) and a bus interface (not shown). Each SPU is a RISC processor clocked at 3.2 GHz and comprising 256 kB local RAM, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU does not directly access the system memory XDRAM; the 64-bit addresses formed by the SPU are passed to the MFC which instructs its DMA controller to access memory via the Element Interconnect Bus and the memory controller.

The Element Interconnect Bus (EIB) is a logically circular communication bus internal to the Processor which connects the above processor elements, namely the PPE, the memory controller, the dual bus interface and the 8 SPEs, totaling 12 participants. Participants can simultaneously read and write to the bus at a rate of 8 bytes per clock cycle. As noted previously, each SPE comprises a DMAC for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz (giga hertz).

The memory controller comprises an XDRAM interface, developed by Rambus Incorporated. The memory controller interfaces with the Rambus XDRAM with a theoretical peak bandwidth of 25.6 GB/s.

The dual bus interface comprises a Rambus FlexIO® system interface. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Processor and the I/O Bridge via controller and the Reality Synthesizer graphics unit via controller.

Data sent by the Processor to the Reality Synthesizer graphics unit will typically comprise display lists, being a sequence of commands to draw vertices, apply textures to polygons, specify lighting conditions, and so on.

Embodiments may include capturing depth data to better identify the real-world user and to direct activity of an avatar or scene. The object can be something the person is holding or can also be the person's hand. In this description, the terms "depth camera" and "three-dimensional camera" refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" refers to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's experience. For example, computer generated costumes can be inserted over the user's clothing, and computer generated light sources can be utilized to project virtual shadows within a video scene. Hence, using the embodiments of the present invention and a depth camera, users can experience an interactive environment within their own living room. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software. The embodiments described herein are also not limited to any specific combination of general hardware circuitry and/or software, nor to any particular source for the instructions executed by processing components.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system, including an electromagnetic wave carrier. Examples of the computer readable medium include hard drives, such as solid state drives (SSDs), hard disk drives (HDDs), digital video disc (DVD) drives, Bluray®, etc., network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for interacting in a social media using a robot, comprising:

receiving a request for registering the robot in the social media, the request received from a user account of a user;

retrieving user profile of the user associated with the user account, the user profile of the user identifying privileges assigned to the user for socially interacting in the social media;

pairing the robot to the user account of the user, the pairing includes generating a second user account and defining a user profile for the robot in the social media, the second user account assigned a subset of the privileges associated with the user account of the user and the user profile of the robot is defined by the subset of privileges, the subset of privileges providing the robot with access to the user account of the user and to at least some of the social interactions in the user account of the user; and receiving social interactions generated by the robot in the social media, the social interactions generated by the robot posted to one or more user accounts of one or more social contacts in the social media that are accessible to the robot, the one or more user accounts of the one or more social contacts identified based on the subset of privileges assigned to the robot, wherein the social interactions of the robot generated over time cause a divergence in the user profile of the robot from the user profile of the user, an amount of divergence of the user profile of the robot limited by a similarity index setting defined for the robot, and wherein operations of the method are performed by a processor of a server computing device within the social network.

2. The method of claim 1, wherein the social interactions generated by the robot are posted to the one or more user accounts upon verifying the user accounts against an access control list maintained for the robot.

3. The method of claim 1, wherein the social interactions are generated by the robot at the user account of the user.

4. The method of claim 1, wherein the social interactions are generated by the robot at the second user account of the robot.

5. The method of claim 1, wherein when the amount of divergence to the user profile of the robot caused by a social interaction exceeds the similarity index setting, preventing the robot from posting the social interaction to the social media.

6. The method of claim 1, wherein the divergence in the user profile of the robot results in dynamic adjustment to the subset of privileges assigned to the robot.

7. The method of claim 1, wherein the similarity index setting for the robot is controlled by the user.

8. The method of claim 1, wherein posting the social interactions further includes, evaluating a social interaction generated by the robot to compute a similarity index of the social interaction; and posting the social interaction to social streams of the one or more social contacts, when the similarity index is within the similarity index setting defined for the robot.

9. The method of claim 1, wherein an adjusted user profile of the robot is used for establishing new social contacts for the robot.

10. The method of claim 1, wherein the social interactions generated by the robot are directed toward the social contacts of the user.

11. The method of claim 1, wherein the social interactions are generated by the robot are directed toward other robots associated with the social contacts of the user.

12. The method of claim 1, wherein the social contacts of the user includes one or more of other robots associated with respective ones of the social contacts established for the user account, wherein each of the other robots adopting user profile of the respective one of the social contacts with whom the other robot is associated.

13. The method of claim 1, further includes,
receiving a request from a new robot associated with a new user to establish a social connection with the robot of the user, the request including a link to the social media and originating from a user account of the new user in the social media; and
generating the social connection between the new robot of the new user and the robot of the user upon receiving a response accepting the request from the robot of the user, the generation of the social connection includes, establishing the new robot of the new user as a social contact of the robot of the user, the social connection providing access to the social interactions and social contacts of the new user that are accessible by the new robot of the new user; and
updating an access control list of the robot of the user with information of the new robot of the new user.

14. The method of claim 13, wherein generating the social connection further includes creating a user account and a user profile for the new robot in the social media identified in the link, the user account created using a subset of the privileges assigned to the new user.

15. The method of claim 1, wherein posting social interactions further includes enabling the robot to provide recommendation to the user in relation to the social interactions generated by the social contacts.

16. The method of claim 1, wherein posting the social interaction further includes,
evaluating the social interaction generated by the robot to determine if the social interaction is related to a condition of the robot; and
when the social interaction is related to the condition of the robot, including the social interaction in social stream of the user associated with the robot.

17. A method for interacting in social media using a robot, comprising:
receiving a social interaction generated by the robot in the social media, the robot having been paired to a user account of a user in the social media, wherein the pairing results in generation of a second user account and a user profile for the robot using a subset of privileges associated with the user account of the user;
evaluating the social interaction generated by the robot using the subset of privileges assigned to the robot in the social media, the evaluation used in computing a similarity index for the social interaction in relation to the social interaction of the user associated with the robot; and
posting the social interaction to social streams of one or more social contacts identified from an access control list defined for the robot, when the similarity index computed for the social interaction generated by the robot is within a similarity index setting defined for the robot,
wherein social interaction generated by the robot causes a divergence in the user profile of the robot from a user profile of the user, an amount of divergence of the user profile of the robot limited by a similarity index setting defined for the robot.

18. The method of claim 17, wherein pairing the robot further includes providing, to the robot, access to social activity grid of the user based on the subset of privileges assigned to the user account of the robot, the social activity grid identifying the social contacts and social interactions defined for the user account of the user.

19. The method of claim 17, wherein posting the social interaction generated by the robot includes updating a social media stream associated with a user account of a social contact.

20. The method of claim 17, wherein posting the social interaction generated by the robot includes updating a social media stream associated with a user account of a robot of a social contact.

21. The method of claim 17, further includes evaluating the social interaction generated by the robot to determine if the social interaction is related to a condition of the robot; and
when the social interaction is related to the condition of the robot, posting the social interaction in a social stream of the user associated with the robot.

22. The method of claim 17, wherein the social interaction generated by the robot relates to, (a) condition of the robot, or (b) status of one or more resource attributes of the robot, or (c) content generated for a specific event, or (d) content generated for a specific activity, or (e) content generated for a specific geo location, or (f) content generated in response to a social interaction from a social contact or the user, wherein the content generated by the robot includes any one of textual content or image content or video content or graphical user interface (GUI) content.

* * * * *